US011625581B2

(12) United States Patent
Gibson et al.

(10) Patent No.: US 11,625,581 B2
(45) Date of Patent: Apr. 11, 2023

(54) HARDWARE IMPLEMENTATION OF A CONVOLUTIONAL NEURAL NETWORK

(71) Applicant: Imagination Technologies Limited, Kings Langley (GB)

(72) Inventors: Clifford Gibson, St. Albans (GB); James Imber, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 938 days.

(21) Appl. No.: 15/585,571

(22) Filed: May 3, 2017

(65) Prior Publication Data

US 2017/0323196 A1   Nov. 9, 2017

(30) Foreign Application Priority Data

May 3, 2016 (GB) ..................................... 1607713

(51) Int. Cl.
| | | |
|---|---|---|
| *G06N 3/063* | (2006.01) | |
| *G06N 3/04* | (2006.01) | |
| *G06F 7/544* | (2006.01) | |
| *G06F 7/00* | (2006.01) | |
| *G06N 3/08* | (2023.01) | |

(52) U.S. Cl.
CPC .............. *G06N 3/063* (2013.01); *G06F 7/00* (2013.01); *G06F 7/5443* (2013.01); *G06N 3/04* (2013.01); *G06N 3/0454* (2013.01); *G06N 3/08* (2013.01)

(58) Field of Classification Search
CPC ................................ G06N 3/063; G06N 3/04
See application file for complete search history.

(56) References Cited

U.S. PATENT DOCUMENTS

| | | |
|---|---|---|
| 9,190,053 B2 | 11/2015 | Penn et al. |
| 9,424,494 B1 | 8/2016 | Lineback et al. |
| 9,430,829 B2 | 8/2016 | Madabhushi et al. |
| (Continued) | | |

FOREIGN PATENT DOCUMENTS

| | | |
|---|---|---|
| CN | 102420931 A | 4/2012 |
| CN | 104915322 A | 9/2015 |
| (Continued) | | |

OTHER PUBLICATIONS

Chen et al. (DaDianNao: A Machine-Learning Supercomputer, Dec. 2014, pp. 609-622) (Year: 2014).*

(Continued)

*Primary Examiner* — George Giroux
(74) *Attorney, Agent, or Firm* — Potomac Law Group, PLLC; Vincent M DeLuca

(57) ABSTRACT

A method in a hardware implementation of a Convolutional Neural Network (CNN), includes receiving a first subset of data having at least a portion of weight data and at least a portion of input data for a CNN layer and performing, using at least one convolution engine, a convolution of the first subset of data to generate a first partial result; receiving a second subset of data comprising at least a portion of weight data and at least a portion of input data for the CNN layer and performing, using the at least one convolution engine, a convolution of the second subset of data to generate a second partial result; and combining the first partial result and the second partial result to generate at least a portion of convolved data for a layer of the CNN.

20 Claims, 13 Drawing Sheets

(56) References Cited

U.S. PATENT DOCUMENTS

| | | |
|---|---|---|
| 9,563,825 B2 | 2/2017 | Shen et al. |
| 9,619,735 B1 | 4/2017 | Lineback et al. |
| 2010/0215253 A1* | 8/2010 | Yamamoto .............. G06N 3/08 382/156 |
| 2011/0029471 A1* | 2/2011 | Chakradhar ........... G06N 3/063 706/25 |
| 2012/0183224 A1* | 7/2012 | Kirsch ..................... G06T 7/00 382/195 |
| 2014/0288928 A1 | 9/2014 | Penn et al. |
| 2016/0062947 A1* | 3/2016 | Chetlur ................. G06F 17/153 708/420 |
| 2016/0342891 A1* | 11/2016 | Ross ....................... G06N 3/08 |
| 2016/0342893 A1* | 11/2016 | Ross ...................... G06N 3/063 |
| 2017/0097884 A1* | 4/2017 | Werner ................ G06F 12/023 |
| 2017/0102941 A1* | 4/2017 | Henry .................. G06F 9/30098 |
| 2017/0103312 A1* | 4/2017 | Henry .................... G06F 9/3001 |

FOREIGN PATENT DOCUMENTS

| | | |
|---|---|---|
| CN | 105205479 A | 12/2015 |
| WO | 2016/030230 A1 | 3/2016 |

OTHER PUBLICATIONS

Conti et al. (A Ultra-Low Energy Convolution Engine for Fast Brain-Inspired Vision in Multicore Clusters, Mar. 2015, pp. 683-688) (Year: 2015).*

Anonymous; "BLIS Retreat 2015"; Sep. 29, 2015; Retrieved from the Internet: URL:http://www.cs.utexas.edu/users/flame/BLISRetreat2015/program.html; p. 2 "A Systematic Approach for Blocking of Convolutional Neural Networks for Architectures With Hierarchical Memories"; 2 pages.

Pedram; Convolutional Neural Networks for Architectures With Hierarchical Memories; Sep. 29, 2015; VLSI Research Group Stanford University; pp. 30-46.

Yang et al; A Systematic Approach to Blocking Convolutional Neural Networks; arxiv.org, Cornell University Libarary, 201 Olin Library Cornell University Ithaca, NY 14853; Jun. 14, 2016; 12 pages.

Zhang et al; "Optimizing FPGA-Based Accelerator Design for Deep Convolutional Neural Networks"; Proceedings of the 2015 ACM/SIGDA International Symposium on Field-Programmable Gate Arrays, FPGA '15; Feb. 22, 2015; pp. 161-170.

Chen et al; "DianNao: A Small-Footprint High-Throughput Accelerator for Ubiquitous Machine-Learning"; Feb. 2014, available at: https://doi.org/10.1145/2644865.2541967; pp. 269-283.

Qiu et al; "Going Deeper with Embedded FPGA Platform for Convolutional Neural Network"; Feb. 2016, available at: https://doi.org/10.1145/2847263.2847265; pp. 26-35.

Gokhale et al; "A 240 G-ops/s Mobile Coprocessor for Deep Neural Networks"; 2014 IEEE Conference on Computer Vision and Pattern Recognition Workshops ; Jun. 23, 2014; pp. 696-701.

* cited by examiner

HARDWARE IMPLEMENTATION OF A CONVOLUTIONAL NEURAL NETWORK

BACKGROUND

A Convolutional Neural Network (CNN) is a type of artificial neural network that can be used for machine learning applications. In particular, a CNN can be used in signal processing applications, including image processing and computer vision applications.

CNNs have been implemented in applications where power resources are not a significant factor. Despite this, CNNs have application in a number of different technical fields in which the resources of the hardware used to implement the CNNs is such that power consumption, processing capabilities, or silicon area are limited.

There is therefore a need to implement hardware that is configured to implement a CNN in an efficient manner, i.e. in a manner that requires less silicon area or less processing power when operating. Moreover, the definition of a CNN for a particular application may vary over time. For example, additional training may result in the definition of the CNN altering. There is therefore also a need for hardware for implementing a CNN to be flexible to the changing requirements of a CNN.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method in a hardware implementation of a Convolutional Neural Network (CNN), the method comprising: receiving a first subset of data comprising at least a portion of weight data and at least a portion of input data for a CNN layer and performing, using at least one convolution engine, a convolution of the first subset of data to generate a first partial result; receiving a second subset of data comprising at least a portion of weight data and at least a portion of input data for the CNN layer and performing, using the at least one convolution engine, a convolution of the second subset of data to generate a second partial result; and combining the first partial result and the second partial result to generate at least a portion of convolved data for a layer of the CNN.

The first subset of data may comprise a first portion of the input data and weight data; and the second subset of data may comprise a second portion of the input data and weight data. The second portion of the input data may comprise a subset of the first portion of the input data and the size of the subset of the first portion of the input data may be based upon a size of a convolution kernel. The first subset of data and the second subset of data may each comprise all of the weight data for a particular layer.

The first subset of data may comprise a first portion of the weight data and input data; and the second subset of data may comprise a second portion of the weight data and input data. The first subset of data and the second subset of data may each comprise all of the input data for a particular layer. The first portion of the weight data may comprise a different portion of the weight data for the layer to the second portion of the weight data. Combining the first partial result and the second partial result may comprise writing the first partial result and the second partial result to a memory.

The first subset of data may comprise a first portion of a weight and input data; and the second subset of data may comprise a second portion of a weight and input data. Combining the first partial result and the second partial result to generate at least a portion of convolved data for a layer of the CNN may comprise: performing, using at least one convolution engine, a convolution of the first portion of a weight with the input data to generate the first partial result; performing, using at least one convolution engine, a convolution of the second portion of a weight with the input data to generate the second partial result; placing the first partial result in an accumulator buffer; combining the first partial result with the second partial result in an accumulator. The first portion of a weight and the second portion of a weight may be non-overlapping portions of the same weight.

The input data of the first subset of data and the input data of the second subset of data may comprise all of the input data for the layer.

There is provided a hardware implementation of a Convolutional Neural Network (CNN), the hardware implementation comprising: an interface configured to receive a first subset of data comprising at least a portion of weight data and at least a portion of input data for a CNN layer, and configured to receive a second subset of data comprising at least a portion of weight data and at least a portion of input data for the CNN layer; at least one convolution engine configured to perform a convolution of the first subset of data to generate a first partial result and configure to perform a convolution of the second subset of data to generate a second partial result; and wherein the hardware implementation is configured to combine the first partial result and the second partial result to generate at least a portion of convolved data for a layer of the CNN.

There is provided a configurable activation module for a CNN configured to implement one or more user-defined activation functions, the activation module configured to: receive configuration data that specifies one or more properties of an activation function to be applied to input data; store, in entries of a lookup table, data representing the activation function based on the received configuration data; receive input data representing an input to the activation function and read one or more entries from the lookup table based on at least a portion of the received input; and calculate an output value representing the output of the activation function based on the one or more entries read from the lookup table.

The hardware implementation of a CNN or the activation module for a CNN may be embodied in hardware on an integrated circuit. There may be provided a method of manufacturing, at an integrated circuit manufacturing system, a hardware implementation of a CNN or an activation module for a CNN. There may be provided an integrated circuit definition dataset that, when processed in an integrated circuit manufacturing system, configures the system to manufacture a hardware implementation of a CNN or an activation module for a CNN. There may be provided a non-transitory computer readable storage medium having stored thereon a computer readable description of an integrated circuit that, when processed, causes a layout processing system to generate a circuit layout description used in an integrated circuit manufacturing system to manufacture a hardware implementation of a CNN or an activation module for a CNN.

There may be provided an integrated circuit manufacturing system comprising: a non-transitory computer readable storage medium having stored thereon a computer readable integrated circuit description that describes the hardware implementation of a CNN or the activation module for a CNN; a layout processing system configured to process the integrated circuit description so as to generate a circuit layout description of an integrated circuit embodying the hardware implementation of a CNN or the activation module for a CNN; and an integrated circuit generation system configured to manufacture the hardware implementation of a CNN or the activation module for a CNN according to the circuit layout description.

There may be provided computer program code for performing a method as claimed in any preceding claim. There may be provided non-transitory computer readable storage medium having stored thereon computer readable instructions that, when executed at a computer system, cause the computer system to perform the method as claimed in any preceding claim.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 7b shows an example method of processing the data of FIG. 7a;

FIG. 8b shows an example method of processing the data of FIG. 8a;

Figure 1:
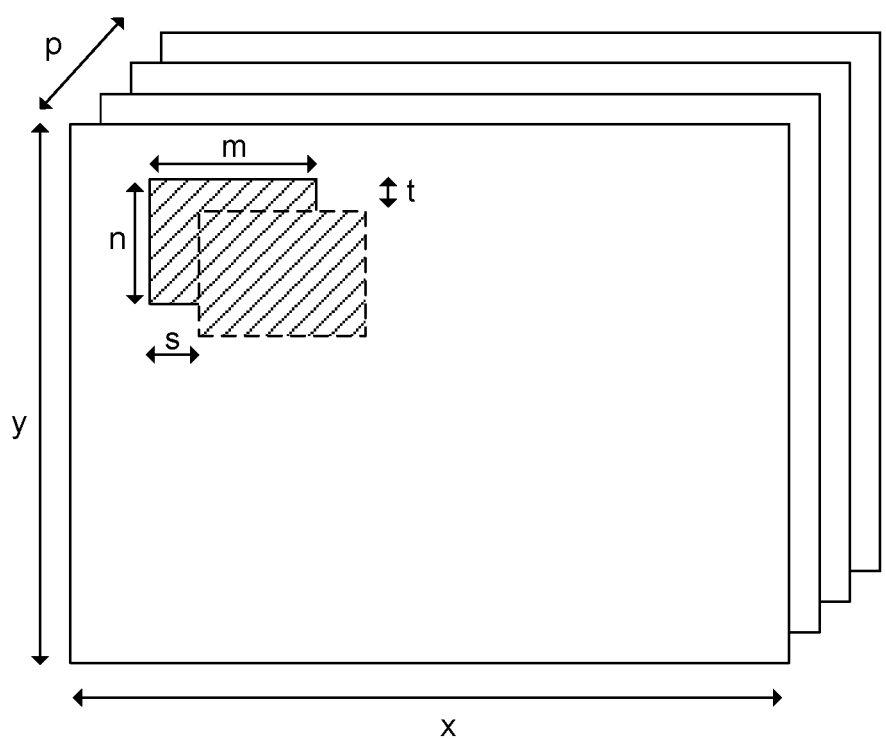
FIG. 1 shows an example of the structure of data used in a Convolutional Neural Network.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

A Convolutional Neural Network (CNN) is a form of artificial neural network comprising a plurality of interconnected layers having weights associated therewith to enable the CNN to perform signal processing tasks, including computer vision tasks. The functionality of the CNN is entirely represented by the weights. In some examples, a CNN may be configured to receive an input image.

An example overview of the format of data utilised in a CNN is illustrated in FIG. 1. As can be seen in FIG. 1, the format of data used in a CNN may be formed of a plurality of planes. The input data may be arranged as P planes of data, where each plane has a dimension x x y. The CNN comprises a plurality of layers each of which has associated therewith a plurality of filters $w_0 \ldots w_n$. The filters $w_0 \ldots w_n$ each have a dimension m×n×P and are be applied to the input data according to a convolution operation across a number of steps in direction s and t, as illustrated in FIG. 1.

As mentioned above, each layer may have associated therewith a plurality of filters $w_0 \ldots w_n$. As used herein, the weights may also be referred to as filters, filter weights, or coefficients. The number and value of filter weights may vary between layers such that for a first layer, the number of weights may be defined as $w_0^1 \ldots w_{n1}^1$ and for a second layer, the number of weights may be defined as $w_0^2 \ldots w_{n2}^2$, where the number of weights in the first layer is n1 and the number of weights in the second layer is n2.

For a plurality of layers of the CNN, the input data for that layer is processed by convolving the input data for that layer using the weights associated with that layer. For a first layer, the 'input data' can be considered to be the initial input to the CNN, which may in some examples be an image—for example where the CNN is being utilised for vision applications. The first layer processes the input data and generates a first set of intermediate data that is passed to the second layer. The first set of intermediate may also take the form of a number of planes of data. The first set of intermediate data can be considered to form the input data for the second layer which processes the first intermediate data to produce output data in the form of second intermediate data. Where the CNN contains a third layer, the third layer receives the second intermediate data as input data and processes that data to produce third intermediate data as output data. Therefore reference herein to input data may be interpreted to include reference to input data for any layer. For example, the term input data may refer to intermediate data which is an output of a particular layer and an input to a subsequent layer. This is repeated until the final layer produces output data that can be considered to be the output of the CNN.

Figure 2:
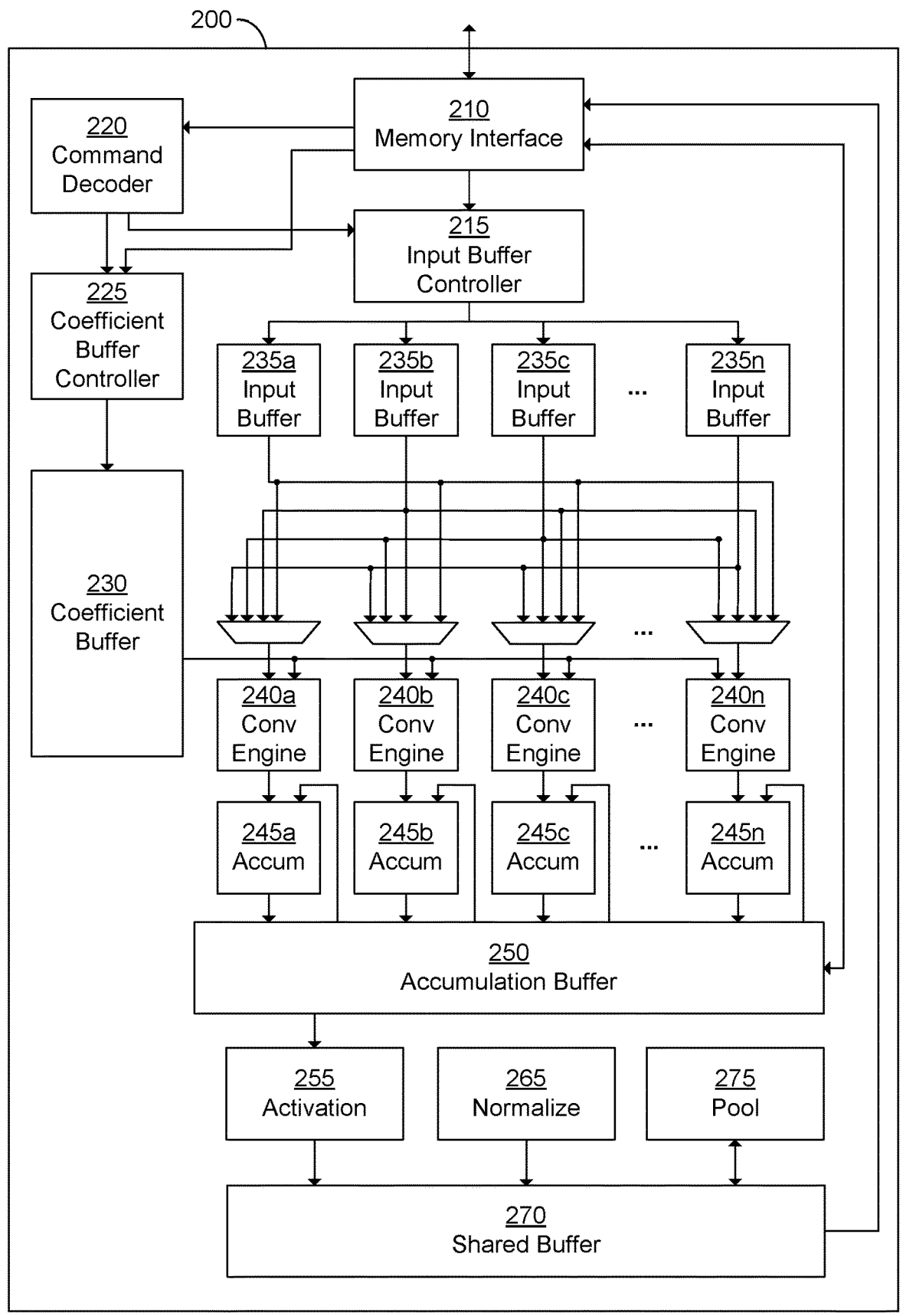
FIG. 2 shows an example hardware implementation of a Convolutional Neural Network.

FIG. 2 illustrates a hardware implementation 200 configured to implement a CNN according to the present disclosure. The hardware implementation comprises digital logic circuitry that is configured to receive data that defines the CNN to be implemented and is configured to operate, in accordance with that data definition to process input data so as to implement the CNN. The hardware implementation may therefore be considered to be configurable hardware for implementing one or more CNNs. In this way, reference herein to a hardware implementation of a CNN is reference to hardware that is configured to implement a CNN by operating on input data in accordance with received configuration data. The hardware implementation itself is not necessarily configured to implement a specific CNN and is not necessarily pre-loaded with specific configuration data for the CNN. For example, the CNN does not need to include pre-loaded (or hard-coded) weight data and layer definitions. The hardware implementation is therefore configured to implement any CNN based on the configuration data it receives. As such, the configuration data (also referred to herein as command data) defines the specific CNN to be implemented, including the number of layers to be included and the size and values of weight data, as well as the expected format of input data.

The data that defines the CNN and how the CNN is to be processed may comprise configuration (or command) data, weight data, and input data. The hardware implementation is therefore configured to process the input data using the weight data in order to perform the operations defined by the CNN. The hardware implementation 200 comprises a memory interface 210, an input buffer controller 215, a command decoder 220, a coefficient buffer controller 225, a coefficient buffer 230, n convolution engines 240, n accumulators 245, an activation module 255, a normalize module 265, a shared buffer 270, and a pool module 275.

The memory interface 210 is configured to provide an interface between the hardware implementation 200 and external memory (not shown). The external memory may be considered as a separate module to the hardware implementation 200 or may be considered to be integrated with the hardware 200. The command or configuration data may, for example, comprise information regarding the size and/or format of the weight data and input data size and format as well as their location in the external memory.

The memory interface 210 is configured to receive, from external memory, weight and data to be used in calculations within the CNN, as well as command information to control the operation of the hardware implementation 200. The received weights (also referred to herein as coefficients) are passed to the coefficient buffer controller 225 and the received data is passed to the input buffer controller 215. The received commands are passed to the command decoder 220, which, in turn, is configured to decode the commands and subsequently issue control information to elements of the hardware implementation, including the coefficient control buffer controller 225 and input buffer controller 215 to control the manner in which the weight and input data is stored in the buffers.

The weights and input data received from external memory via memory interface 210 during a read of the external memory may form the weights and input data for only a portion of a single layer, all of the weights and input data to be used in processing a single layer, or may comprise the weights and input data for processing multiple layers. For example, the weights received from external memory may form the weights of a single layer and the input data received may form only a portion of the input data for a single layer (or vice versa). Any combination of data and weights across one or more layers may be received from external memory in a single read from the memory (for example using a burst read).

In practice, the number of weights and data received in a single read from external memory will depend upon the size of the coefficient buffer 230 and the input buffer 235. The weights are passed from the coefficient buffer controller 225 to the coefficient buffer 230 and the data received is passed from the input buffer controller 215 to a plurality of input buffers 235a-235n. The number of input buffers will depend upon the specific implementation of the hardware 200 but may take any value. The input data is shared across all of the input buffers 235a-235n. The input buffers each form an effective bank such that the number of input buffers can be increased or decreased depending on the application.

Figure 3:
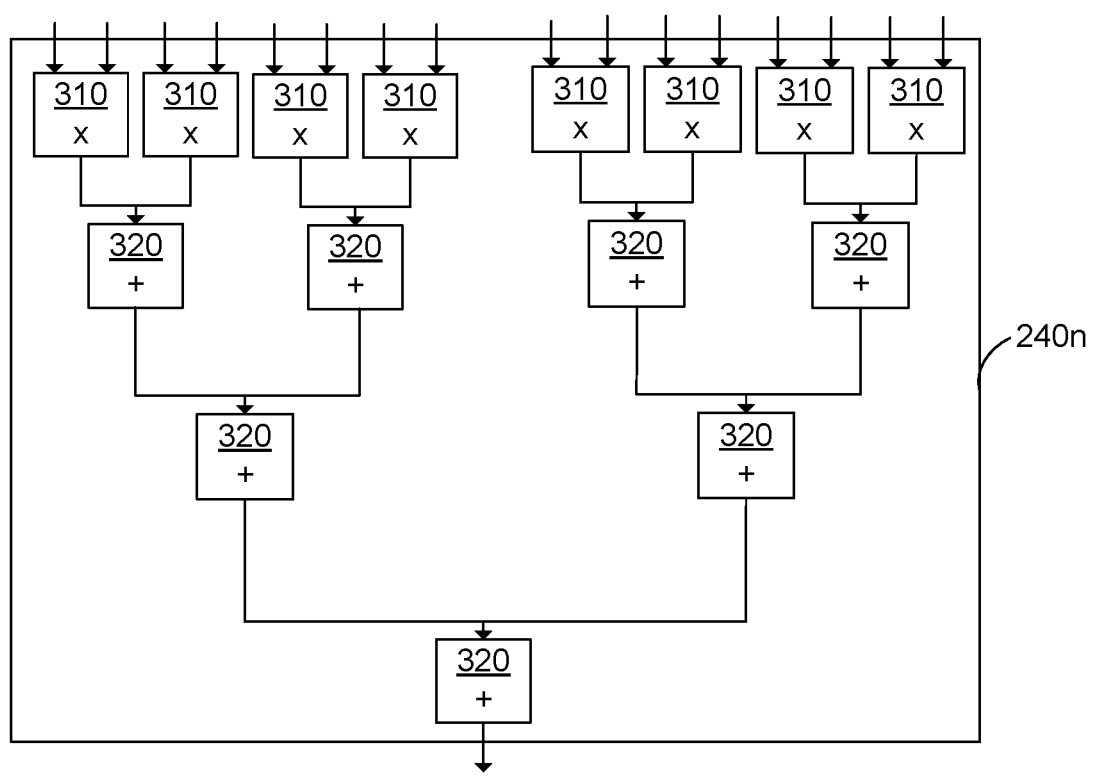
FIG. 3 shows an example of a convolution engine illustrated in FIG. 2.

The input buffers 235a-235n are connected to each of a plurality of multiplexers since each convolution engine 240a-240n requires access to all of effective 'banks' of the input data. The multiplexers are each configured to select an output from one of the input buffers and to pass the values output from the selected input buffer to a respective convolution engine 240a-240n. In addition, weights from the coefficient buffer 230 are provided as a second input into each convolution engine 240a-240n. The convolution engines are configured to perform a convolution operation on the received input data using the weights received from the coefficient buffer 230. The resultant output of each convolution engine 240a-240n is provided as an input to a respective accumulator of a plurality of accumulators 245a-245n. An example implementation of a convolution engine 240n is illustrated in FIG. 3, which comprises a plurality of elements of multiply logic 310 and a plurality of elements of addition logic 320.

Each accumulator 245a-245n is connected to an accumulation buffer 250. The accumulation buffer 250 is configured to store accumulated results received from each accumulator 245a-245n. The accumulation buffer 250 is connected to the memory interface 210. As such, the accumulation buffer 250 is configured to send and receive data to and from external memory via memory interface 210. Specifically, the accumulation buffer 250 is configured to be able to store and restore its values from the external memory via memory interface 210, as will be described in more detail below. The accumulation buffer 250 is connected to the input of the accumulators 245a-245n and is configured to feed values back into the accumulators 245a-245n to accumulation calculations to take place.

Activation Module

Figure 4A:
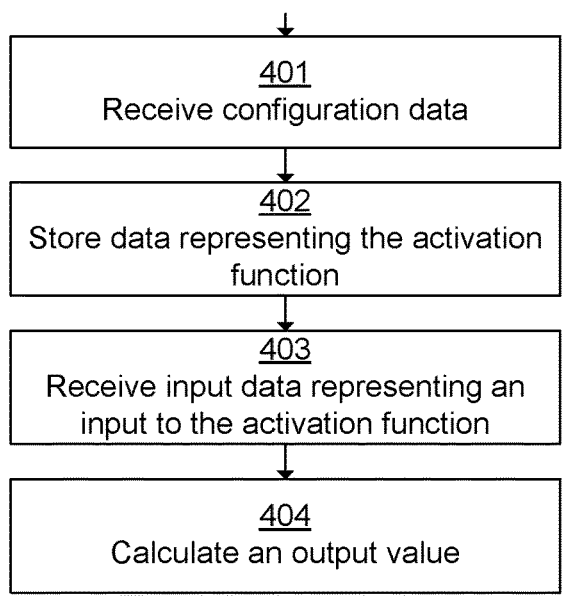
FIG. 4a shows an example method for operating an activation module.

The accumulation buffer 250 is configured to pass accumulated values to the activation module 255. The activation module 255 is configured to perform at least one of a number of different activation functions. There is provided an activation module configured to perform a method as illustrated in FIG. 4a. In particular, the activation module is a configurable activation module for use in a CNN. The activation module may be configured to implement one or more user-defined activation functions. The activation module may be configured to receive at step 401 configuration data that specifies one or more properties of an activation function to be applied to input data. The configuration data can be used to specify, for example, one or more data points of the activation function, one or more characteristics of the activation function, or more or more values that can be used to derive or identify a particular activation function to be implemented in the activation module 255 for one or more passes of the activation function.

The activation module 255 may be further configured to store at step 402, in entries of a lookup table, data representing the activation function based on the received configuration data. In some examples, the data representing the activation function may be the received configuration data. In some arrangements, where the configuration data comprises data points of the activation function, the data points may themselves be stored in the lookup table. In some arrangements, the configuration data may be used to identify a pre-stored activation function so that data representing that identified activation function (such as data representing the data points of that pre-stored activation function) can be loaded into the lookup table—for example using an identifier in the configuration data. In some arrangements, the data stored in the lookup table may be gradient and offset values of at least a portion of the activation function. The values in the lookup table may therefore represent an estimate or approximation of the activation function.

The activation module 255 may be configured to receive at step 403 input data representing an input to the activation function and may be configured to read one or more entries from the lookup table based on at least a portion of the received input. In some arrangements, the activation module 255 is configured to use at least a portion of the received input as an address into the lookup table. For example, a pre-defined number of values may be stored in the lookup table and the value of the received input may be the value used as an address into the lookup table. For example, the address to be used may be determined from a pre-defined number of MSBs of the input data.

The activation module may be configured to calculate, at step 404, an output value representing the output of the activation function based on the one or more entries read from the lookup table. The activation module may calculate the output value further based on at least a portion of the input data, for example a pre-defined number of LSBs of the input data. The portion of the input data used to lookup one or more entries in the lookup table may be different from the portion of the input data used to calculate the output value.

The activation module may calculate the output value by interpolating between two or more entries read from the lookup table. For example, where at least two entries are read from the lookup table, a linear interpolation may be performed using the two entries and at least a portion of the input data. For example, where at least three entries are read from the lookup table, a quadratic interpolation may be performed using the three entries and at least a portion of the input data.

In some arrangements, it may be possible to define, in the configuration data, data points, the shape of the function, or the identifier of the function to be implemented. For example, it may be possible to identify one of a number of pre-defined functions to be implemented.

Figure 4B:
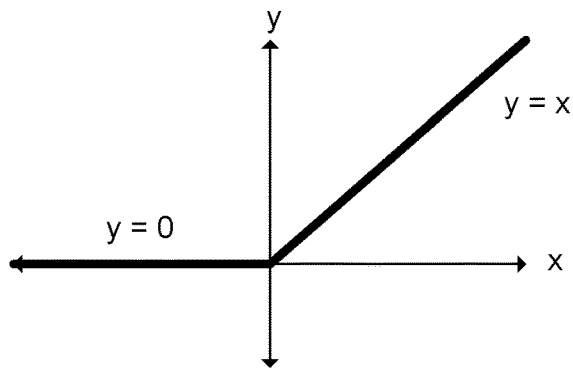
FIG. 4b shows a Rectified Linear Unit (ReLU) function that can be implemented in an activation module illustrated in any of FIGS. 2, 4d, and 4f.

In some implementations, the activation module 255 may be configured to operate as a Rectified Linear Unit (ReLU) by implementing a ReLU function (which may be implemented by receiving control data defining points of the activation function). In a ReLU function, the output element $y_{i,j,k}$ is calculated by identifying a maximum value as set out below and as illustrated in FIG. 4b:

$$y_{i,j,k}=f(x_{i,j,k})=\max\{0,x_{i,j,k}\}$$

Accordingly, for x values less than 0, y=0.

Figure 4C:
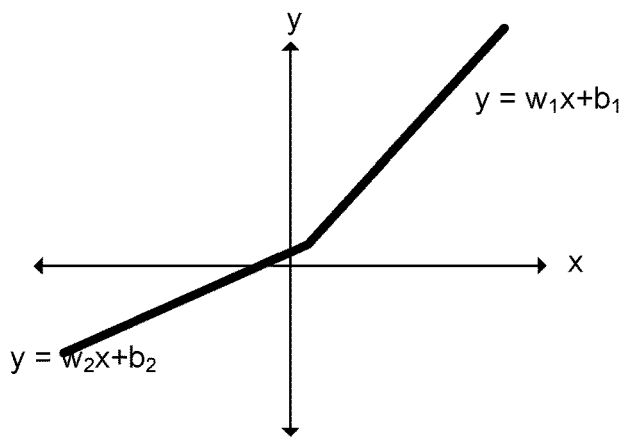
FIG. 4c shows a Parametric Rectified Linear Unit (PReLU) function that can be implemented in an activation module illustrated in any of FIGS. 2, 4d, and 4f.

In some implementations, the activation module 255 may be configured to operate as a Parametric Rectified Linear Unit (PReLU) by implementing a PReLU function. The PReLU function performs a similar operation to the ReLU function. Specifically, where $w_1$, $w_2$, $b_1$, $b_2 \in \mathbb{R}$ are constants, the PReLU is configured to generate an output element $y_{i,j,k}$ as set out below and as illustrated in FIG. 4c:

$$y_{i,j,k}=f(x_{i,j,k};w_1,w_2,b_1,b_2)=\max\{(w_1*x_{i,j,k}+b_1),(w_2*x_{i,j,k}+b_2)\}$$

In some implementations, the activation module 255 may be configured to perform one or more other functions, depending on the specific application. In some implementations, the activation module 255 may be configured to be programmed with a specific function that is to be performed. For example, the activation module 255 may be configured so that, for a particular layer of the CNN, it receives data that defines the function to be performed. The function to be implemented in the activation module (i.e. the activation function) can be considered to be a transfer function.

In one approach to representing the activation function, the entries in the lookup table can be formed of at least one gradient and at least one offset. For example, the data received may represent gradient and offset pairs. In this way, the activation module 255 may therefore implement the activation function as a value and slope look up table with a linear interpolation used for intermediate values. An input value (for example from the accumulation buffer) can be used as an address into the lookup table. In one example, where the lookup table is a 64-entry table, the 6 MSBs of the input may be used as the address into the lookup table. The lookup table may contain values for the sample C and the gradient m at the point defined by the MSBs. In this case, the remaining bits of the input may be interpreted as a value between 0 and 1, such that the output of the activation module is defined by:

$$y=m*(\text{LSBs})+C$$

Figure 4D:
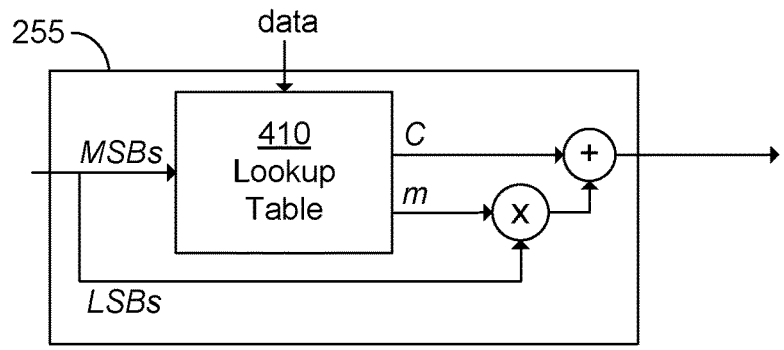
FIG. 4d shows an example hardware implementation of an activation module illustrated in FIG. 2.

An example hardware implementation of the activation module 255 of this arrangement is illustrated in FIG. 4d. As illustrated in FIG. 4d, the activation module 255 may comprise a lookup table 410 that is configured to store values which represent the activation function that is to be implemented within the activation module 255. The activation module 255 further comprises multiplication logic and addition logic in order to perform the calculation defined above. In particular, the MSBs of an input value are used as an address into the lookup table and the corresponding m and C values are read from the lookup table and output. The remaining LSBs of the input value are then multiplied with the lookup table output m, the result of which is then added to the lookup table C.

Figure 4E:
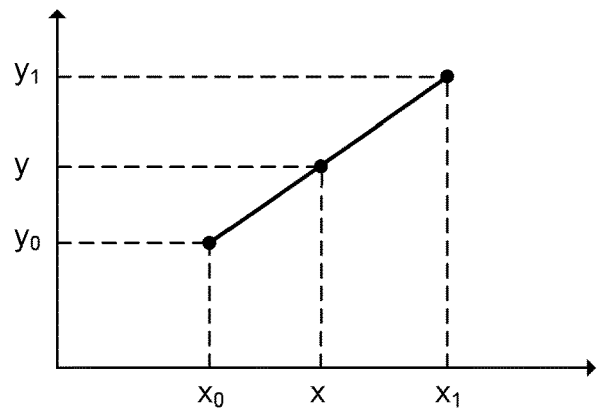
FIG. 4e shows an example of an interpolation performed in an activation module of FIG. 4f.
Figure 4F:
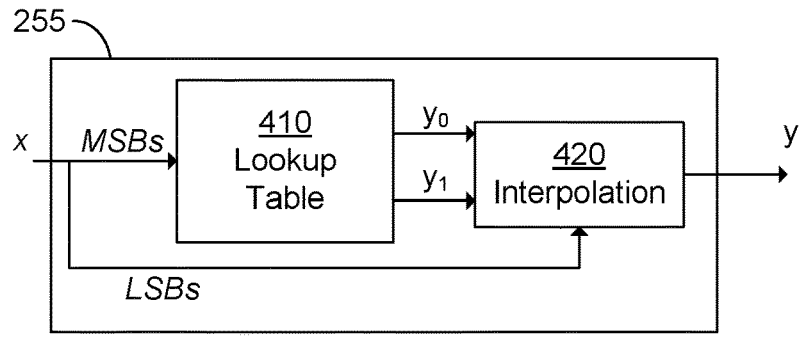
FIG. 4f shows another example hardware implementation of an activation module illustrated in FIG. 2.

In another arrangement, instead of storing in the lookup table m and C values which are then retrieved, two different coarse output values are determined which are located either side of the input value. The output value to be output from the activation module is determining by interpolating between the two coarse output values based on at least a portion of the output values as described below with reference to FIGS. 4e and 4f. In particular, this arrangement may involve storing in the lookup table a set of discrete output values. Using the 64-entry table example described above, each entry may represent one of 64 different output values of the activation function. Then, when an input value is received, the six MSBs of the input value may be used as an address to lookup a corresponding output value in the table. In addition, the output value at the next address location in the lookup table may also be retrieved. As illustrated in FIG. 4f, the MSBs of the input value may correspond with input value $x_0$ and it may be determined that the next corresponding input value is $x_1$. Accordingly, the two values retrieved may be the corresponding output values for the identified input values, namely $y_0$ and $y_1$. From the retrieved output values $y_0$ and $y_1$, the LSBs are used to interpolate the input value x to determine an estimate for the corresponding output value y.

FIG. 4f illustrates an example hardware arrangement configured to perform the interpolation approach described above with reference to FIG. 4e. In this arrangement the activation module 255 comprises a lookup table 410 configured to store output values that can be retrieved based on a lookup using the corresponding input values. The lookup table 410 is configured to receive the data to be stored in the lookup table 410. In this way, the specific activation function to be performed by the activation module 255 is configurable. The activation module 255 further comprises an interpolation module 420 configured to perform an interpolation operation to calculate y. This interpolation may be achieved using the following equation:

$$y = y_0 + (y_1 - y_0)\frac{x - x_0}{x_1 - x_0}$$

As illustrated in FIG. 4f, the activation module 255 is configured to receive an input value x. A pre-defined number of n MSBs (which corresponds to $2^n$ entries in the lookup table) is used as an address into the lookup table to retrieve an output value $y_0$ at a corresponding address in the lookup table as well as the next output value in the lookup table, $y_1$. These two values $y_0$ and $y_1$ are output from the lookup table 410 and input in the interpolation module 420, which performs an interpolation based on the remaining LSBs of the input value x to determine y. The interpolation module 420 then outputs the output value y that corresponds with the input value x.

Figure 4G:
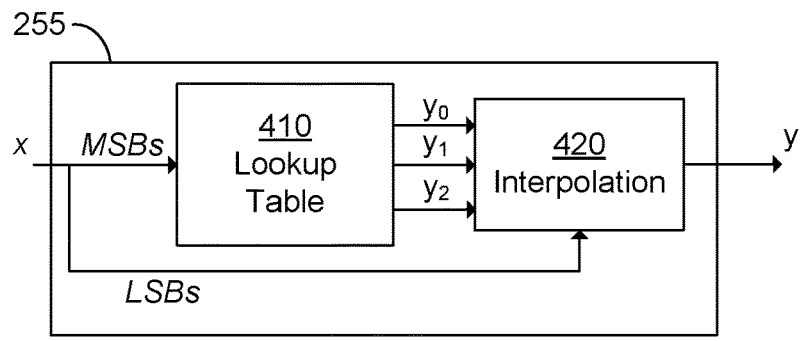
FIG. 4g shows another example hardware implementation of an activation module illustrated in FIG. 2.

A further hardware implementation of the activation module 255 is illustrated in FIG. 4g. In the arrangement of FIG. 4g, the lookup table is configured to retrieve three output values, namely $y_0$, $y_1$, and $y_2$ based on the MSBs of the input value x. This enables, for example, a quadratic interpolation to be performed by the interpolation module 420. In this way, more complex curves can be interpolated by retrieving from the lookup table 410 more coefficients. It will be appreciated that more than three values can be retrieved and used to interpolate an output value for the input value.

As mentioned above, the activation module 255 may be configured to receive a set of values that define the activation function to be performed. The received values may form the values to be retrieved from the lookup table 410 such that they can be loaded into the lookup table 410. In some implementations, the activation module 255 may be configured to receive values that define the function to be performed from the command decoder 220. The command decoder 220 may be arranged to receive the values of the function from external memory via the memory interface 210. In some implementations, the command decoder 220 may be configured to receive values defining a function that is to be used across multiple layers of the CNN implementation. In some implementations, the command decoder 220 may be configured to receive values defining a function that is to be used only for a single layer. Accordingly, for each layer to be processed, the command decoder 220 may receive from external memory the values to be inserted into the lookup table 410. The command decoder 220 may then proceed to load into the lookup table 410 for each layer a different set of values that define a function to be performed by the activation module 255 during the processing of that layer. In some arrangements, the activation module 255 may be configured to receive from the command decoder a different set of values to be stored in the activation layer for each hardware pass. Put another way, each different input value may be processed using a different activation function. The command decoder may receive a number of different commands and the command decoder may be configured to control the hardware implementation 200 so that the data being received by the activation module 255 corresponds with the specific activation function loaded into the activation module 255 at the time that the data is received.

It will be appreciated that there are other approaches to implementing an activation function based on the storage of values (which can be considered to be coefficients of the activation function) in a lookup.

Normalize Module

The resultant value calculated by the activation module 255 is passed to be processed by the normalize module 265 via the shared buffer 270. The normalize module 265 is configured to perform one of a number of different normalizing functions as set out below.

A Local Response Normalisation Layer function may be performed within the same plane of input data according to the following equation:

$$f(u_f^{x,y}) = \frac{u_f^{x,y}}{\left(k + \frac{\alpha}{N^2}\sum_{x'=max(0,x-\lfloor N/2\rfloor)}^{min(S,x-\lfloor N/2\rfloor+N)} \sum_{y'=max(0,y-\lfloor N/2\rfloor)}^{min(S,y-\lfloor N/2\rfloor+N)} (u_f^{x',y'})^2\right)^\beta}$$

In the above equation, $u_f^{x,y}$ is the activity of a unit in map f at position x, y prior to normalisation, S is the size of the input data (e.g. image data), k is a constant, and N is the size of the region to use for normalisation. The output dimensionality of this function is equal to the input dimensionality. In some examples, this module may be configurable in a similar manner as described above with respect to the activation module 255. Specifically, the normalize module may be configured to receive parameters α and β from the command decoder 220 which has received such parameters from external memory. In this way, the implementation of the Local Response Normalisation Layer function may be modified for each layer, or may be modified over the course of several layers.

The Local Response Normalisation Layer function may also be performed across planes. The function is similar to the normalisation function described above with some minor differences. Specifically, the units are divided only by the activities of other units in the same position but in different planes. The parameter N indicates the number of adjacent filters to use for normalisation. For example, if a layer has 32 maps then a unit in the $7^{th}$ map may be normalised by units in the $5^{th}$ to $9^{th}$ maps, when N is set to 5. The function that is used for the Local Response Normalisation Layer function across planes is set out below:

$$f(u_f^{x,y}) = \frac{u_f^{x,y}}{\left(1 + \frac{\alpha}{N^2} \sum_{f'=max(0,f-\lfloor N/2 \rfloor)}^{min(F,f-\lfloor N/2 \rfloor+N)} (u_{f'}^{x',y'})^2\right)^\beta}$$

In the above equation, F is the number of maps. As with the Local Response Normalisation Layer between planes, the parameters α and β can be received from external memory via the command decoder 220.

The normalize functions described above may be implemented in hardware in the normalize module 265 using the following equation:

$$f(u_f^{x,y}) = u_f^{x,y} * \text{EXP}\left(C * Ln\left(\gamma + K \sum_{i=0,j=0}^{i=m,j=m} u_f^{i,j^2}\right)\right)$$

In the above equation, EXP is a hardware implementation of the exponential function $e^x$, Ln is a hardware implementation of the natural logarithm function ln(x), and C, k, and γ are constants that are received, where C=−β and $$k = \frac{\alpha}{\text{Number of samples in a normalisation window}}.$$

One possible implementation of the above described functions is to prove lookup tables to perform the EXP and Ln functions, in a similar manner to that described above in respect of the activation module 255. As described previously, the constants C, k, and γ may be received from external memory via the command decoder 220 and may be defined per layer, or defined for a subset of layers. A normalisation window size may be programmable per layer.

The normalise module 265 may also be configured to implement a Local Contrast Normalisation Layer function, defined as:

$$f(u_f^{x,y}) = \frac{u_f^{x,y}}{\left(1 + \frac{\alpha}{N^2} \sum_{x'=max(0,x-\lfloor N/2 \rfloor)}^{min(S,x-\lfloor N/2 \rfloor+N)} \sum_{y'=max(0,y-\lfloor N/2 \rfloor)}^{min(S,y-\lfloor N/2 \rfloor+N)} (u_{f}^{x',y'} - m_f^{x,y})^2\right)^\beta}$$

In the above equation, $m_f^{x,y}$ is the mean of all $u_f^{x,y}$ in the 2D neighbourhood defined by the summation bounds. Local Contrast Normalisation could, for example, be implemented using a modification of filter weights or using an adjusted parametric ReLU operation.

The normalize module 265 may be configured to implement one or more of the above described normalisation functions. Specifically, the normalize module 265 may be configurable such that it is capable of performing any of the above three functions, and any other suitable functions. In this way, the normalize module 265 may receive signalling to indicate which function the normalize module is to perform. This may be performed using one of a number of pre-defined functions such that the control signalling received by the normalize function indicates which of the pre-defined functions the normalize module 265 should perform.

In other arrangements, the normalize module 265 is configured in a similar manner to the activation module 255 such that the normalize module 265 is able to receive values that define the values to be inserted into a lookup table. In this way, the normalize module 265 can be configured via an external control. The control signalling may be received from external memory via command decoder 220.

It is not necessary for the control signalling to the activation and normalise modules to be received via the command decoder 220 and it will be appreciated that the activation 255 and normalize 265 modules may be controlled via another external interface or via a direct connection to the memory interface 210. Other arrangements are also possible.

Pooling

The result of the normalize function performed in the normalize module 265 is passed to the pool module 275 via the shared buffer 270. In the pool module 275, a pooling operation is performed. In some arrangements, the pooling operation takes place over a sliding window that is defined per layer. The operation performed in the pooling layer is similar to the operations performed in the convolution engines 240a-n. Examples of pooling functions include max and mean calculations.

A result stored in the shared buffer 270 is passed to the memory interface 210, which can either store the result in external memory or pass the result back into the input buffers for further processing without having to first be passed out to external memory.

The shared buffer 270 is configured for two purposes, namely to buffer values from the activation module 255 until the correct samples are available to perform normalisation and/or to buffer the values from the normalisation unit the correct samples are available to perform pooling. In this way, a shared buffer is used for efficiency of storage since, in many implementations, the normalisation and pooling are not combined in the same process.

Normalization may be either "same map", where data is normalised against an N×N region from the same plane, or "across plane" where data is normalised in a window in the P dimension. In the latter case the filter always takes a single sample from each plane. Consideration of the Normalization mode must be made when deciding how to sub-divide larger dimensional layers for processing such that the shared buffer holds the correct data. If the size of the window N×N becomes too large for the components to be held in the shared buffer, then the Normalization becomes a 2-pass operation. The statistics for normalization are gathered on write out, with the normalization being applied on read of the data for the following layer.

Configurability

Whilst the hardware implementation of FIG. 2 illustrates a particular order in which the modules are arranged and thus how the processing of data flows through the hardware implementation, it will be appreciated that the specific calculations required and the order in which data is processed across layers may vary.

In some layers, the functions performed by the activation 255, normalize 265, and pool 275 modules may be used to perform activation, normalisation, and pooling operations. In other layers, only one of these functions may be performed and not necessarily in the order set out in the hardware implementation 200. To achieve a configurable order of processing these functions, each of the activation 255, normalize 265, and pool 275 modules may be configured to receive control signalling configuring the module into a bypass mode in which the function is not performed and the input values are simply passed through the modules without change.

In some layers, the data of a particular layer may need to be processed first by the convolution engines 240a-n and then second according to the activation, normalize, and pool modules 255, 265, 275. In these layers, the output from the convolution engines 240a-n are passed via the accumulators 245a-n to the accumulation buffer 250 and are then passed to activation, normalize, and pool modules 255, 265, 275 for further processing. In other layers, the data may need to be processed differently. For example, data may need to be processed first according to the activation, normalize, and pool modules 255, 265, 275 and second according to the convolution engines 240a-n.

In these arrangements, data can be passed directly to the activation module via the accumulation buffer 250, where the accumulation buffer 250 has received the input data directly from the memory interface 210 which has received the data from external memory. In this way, the processing performed by convolution engines 240a-n and accumulator 245a-n is effectively skipped and the data can be passed directly to the activation 255, normalize 265, and pool 275 modules. Then, once processing using activation, normalize, and pool modules 255, 265, 275 is completed, the resultant values can be passed into the input buffer controller 215 via the memory interface 210. In some arrangements, the resultant values can be first passed to external memory via memory interface 210 and then retrieved from external memory before use.

In other arrangements, the memory interface 210 may pass the resultant values to the input buffer controller 215 without passing the values to external memory. By avoiding the need to pass the values resulting from calculations using the activation, normalize, and pool modules 255, 265, 275 to external memory, memory bandwidth is reduced and therefore the latency in processing the data is also reduced.

By providing the above-described features, it is possible for the hardware implementation 200 to handle a variety of different configurations of CNNs by providing the capability for memory-to-memory calculations to be performed. These memory-to-memory calculations do not need to be directly correlated with a particular layer. Put another way, the hardware implementation 200 is adaptable to the specific CNN that is to be implemented. Advantageously, since the activation, normalize, and pool modules 255, 265, 275 are placed linearly it is possible to perform these functions back-to-back without having to retrieve data from external memory.

In some implementations, the order in which the activation, normalize, and pool modules 255, 265, 275 are connected may vary. For example, the activation, normalize, and pool modules 255, 265, 275 may be connected in reverse order such that the pool module is connected to the accumulation buffer 250 and the activation module is connected to the memory interface 210.

Partial Processing

In typical hardware implementations of CNNs it is desirable to reduce the number of accesses to external memory required, whilst maintaining a reduced silicon footprint and also reducing the amount of power consumed in processing the CNN. However, in typical CNN applications the amount of data to be processed varies between layers. Accordingly, a CNN implementation typically requires a very large hardware implementation footprint to handle each layer of the CNN that is to be processed since the hardware implementation may be required to have buffers and processing capabilities to handle the most processor intensive of layers, even if previous or subsequent layers require less processing or data storage. Put another way, the buffers and calculation logic should be large enough to be able to process any particular layer, including layers having the largest weight size, the largest number of weights and the largest amount of data. However, where the CNN is implemented in this way, the processing of smaller layers is inefficient since the buffers and calculation logic may not be fully utilised in other, smaller layers.

The hardware implementation of a CNN described herein provides a flexible implementation that allows the CNN inputs (e.g. data and weights for each layer) to be separated or segmented into a number of different portions that can be processed separately to produce partial results. These partial results may then be combined to produce the output from a particular layer. By segmenting or splitting data in the manner described below, the CNN is able to be implemented in a way that meets silicon budgets without compromising on the capability to handle different sizes of data per layer, a different number of weights, and size of weights.

Moreover, it is preferable to minimise the number of fetches and writes to memory that are performed when operating the CNN. The number of fetches and writes to memory performed in the present hardware implementation may depend upon the sizes of the data buffer and the coefficient buffer. Specifically, there are three scenarios in which the inputs for a particular layer of the CNN cannot be handled in a single read from memory. This may arise because the inputs to a layer are wrongly sized for the buffers that are implemented in hardware and thus special handling of the input data needs to be provided.

Figure 5:
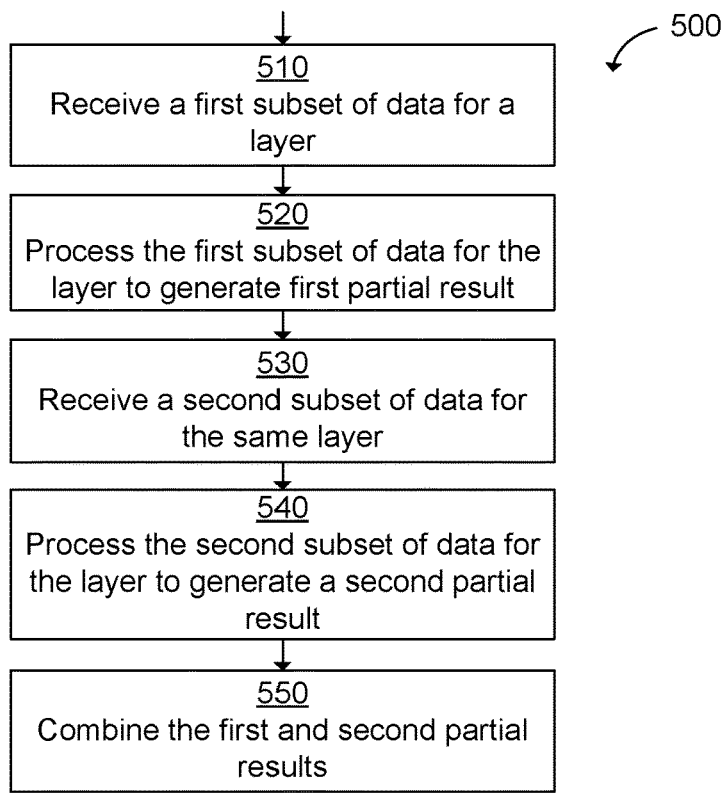
FIG. 5 shows an example method of processing data in the hardware implementation of a CNN of FIG. 2.

FIG. 5 illustrates a method 500 of processing data for a layer according to the present disclosure. The method begins at step 510, wherein a first subset of data for a layer is received. The first subset of data may be defined by control data. At step 520, the first subset of data for the layer is processed to generate a first partial result. At step 530, a second subset of data for the same layer is received. At step 540, the second subset of data for the layer is processed to generate a second partial result. At step 550, the first partial result and the second partial result are combined.

In an example, method 500 of FIG. 5 may be implemented in the hardware implementation illustrated in FIG. 2. The first subset of data may be a subset of the input data for the layer, a subset of the weights of the layer, or a portion of at least one weight for the layer. Where the first subset of data is a subset of the input data for a layer, the first subset is received in the input buffers 235a-235n at step 510 via the input buffer controller 215 and the memory interface 210. Where the first subset is a subset of the weight data, the first subset is received at the coefficient buffer 230 via the coefficient buffer controller 225 and the memory interface 201.

At step 520, the first subset of data (i.e. the subset of input data, subset of weights of the layer, or a portion of at least one weight for the layer) is processed to generate a first partial result. The processing involves passing to the one or more convolution engines 250a to 250n the first subset of data and the corresponding weight or input data (depending on the first subset of data). The convolution engines are configured to perform convolution operations between the weight data and the input data. Since the hardware implementation has a pre-defined number of convolution engines, it is possible to pre-configure the size of the first subset of data so that the convolution engines are able to perform all of the convolution operations for the first subset of data in a single pass or in a pre-defined number of passes. For example, where the first subset of data is a subset of the input data, it may be possible to split the input data into batches that can each be handled in a single pass of the convolution engines. Other limitations on the first subset of data are the sizes of the coefficient buffer 230 and the size of the input buffers 235a to 235n and the identification of a first subset of data may also depend on the size of one or more of the input buffers 235a to 235n and the coefficient buffer 230.

Having processed, at step 520, the first subset of data, a partial result is generated. The partial result that is generated will depend upon the type of data selected as the first subset of data. For example, the first subset of data may be a subset of the input data. In this case, the first partial result may be the result of processing the first subset of input data with the weight data. Similarly, the first partial result may be the result of processing all of the input data with a subset of weight data (or a portion of at least one weight). This will be explained in more detail later. The first partial result may be held in the accumulators 245a to 245n before being passed to the accumulation buffer 250.

At step 530, a second subset of data for the same layer is received in the same manner as for the first subset of data. For example, where the first subset of data relates to weight data, the first subset of data is stored in the coefficient buffer. Where the second subset of data relates to input data, the first subset of data is stored in the input buffers 235a to 235n.

At step 540, the second subset of data for the layer is processed to generate a second partial result. As with the first subset of data, the second subset of data is processed in the convolution engines 240a to 240n. It will therefore be appreciated that the second subset of data is processed subsequently to the first subset of data using the same convolution engines. In this way, the first and second subsets of data are processed in separate passes of the convolution engines. At step 550, the first partial result and the second partial result are combined in the accumulators as passed to the accumulation buffer 250 to form a combined result that forms at least a part of an output for a particular layer of the CNN. In this way, it is possible to split the data processing for a layer into smaller batches of work that can be handled by a hardware implementation that is too small to be able to handle all of the processing of a layer in a single pass.

Number of Filter Weights

As mentioned above, the first subset of data may be formed by a subset of the weights.

This may be the case, for example, since the coefficient buffer 230 has a pre-defined size in the hardware implementation 200. The coefficient buffer 230 is arranged to store filter weights received via coefficient buffer controller 225. For example, the coefficient buffer 230 may be required to provide 16×8 weights per clock to the convolution engines 240a-240n. In some arrangements, the coefficient buffer 230 may be sized such that it is capable of storing all m*n*p*f weights for a particular layer, where m and n define the size of the convolution kernel and f defines the number of weights for a particular layer. However, in other arrangements, the coefficient buffer may not be large enough to store all m*n*p*f weight values for a particular layer. In these circumstances, the hardware implementation 200 may be required to process the weights in a different manner, as is described below.

In an example, the number of weights f may be too large such that not all of the filter weights can be stored in the coefficient buffer 230 at a given point in time. In this situation, hardware implementation 200 is configured to split the total number of weights f, each having a size m*n*p, for a particular layer into two or more subsets of weights. The coefficient buffer is then able to store a first subset of the two or more subsets and to pass the first subset to the convolution engines 240a to 240n.

For example, the filter weights may be split into a first subset of weights and a second subset of weights, such that the filter weights for a particular layer are either in the first subset or the second subset (in other examples, there may be any number of subsets). The first subset of weights may comprise a first number $f_1$ of filter weights, i.e. $w_0 \ldots w_{f_1-1}$, may be stored in the coefficient buffer as will be described below. Once the first number $f_1$ of filter weights has been processed to generate a first partial result, the resultant values may be stored in the accumulators until passed to the accumulation buffer 250, or may be passed via the memory interface 210 to external memory. Having stored the resultant values from processing the first number $f_1$ of filter weights, the hardware implementation 200 may be configured to load the second subset of weights comprising a second number $f_2$ of weights, i.e. $w_0 \ldots w_{f_2-2}$, into the coefficient buffer and to process the second subset of weights as described above. $f_2$ may be equal to $f_1$ or may differ in value. The result of the convolution operations of the second subset of weights with the input data forms a second partial result. The second partial result for the second subset of weights can then be combined with the values calculated according to the first subset of weights in order to arrive at the complete set of resultant intermediate data for a particular layer.

By splitting the filters into two or more subsets by processing the subsets separately, it is possible to process a layer in which the number of filter weights is too large to fit into the coefficient buffer. Accordingly, it is possible to provide a flexible implementation which is able to process a CNN having layers that have a large number of filter weights associated therewith, whilst maintaining a relatively small silicon area.

In order to process the two subsets separately, the memory interface 210 is configured to receive a first set of the weights and the input data for a particular layer (or possibly a subset of the input data for a particular layer). As set out above, the first subset of weights is stored in the coefficient buffer 230 and the input data for that layer is stored in the input buffers 235a-n. The first subset of weights is used to process the input data and the values generated by processing the input data using the first subset of weights is stored back into external memory via the memory interface 210. Subsequently, the input data for that layer is re-read (e.g. the same data is read again) from memory and stored in the input buffers 235a-n. In addition, the second subset of weights for the layer are retrieved and stored in the coefficient buffer 230. The input data for that layer is then processed again using the second subset of weights in the same manner as described above with respect to the first subset of weights. The values generated by processing the input data for the layer using the second subset of weights are then stored in the external memory.

Figure 6:
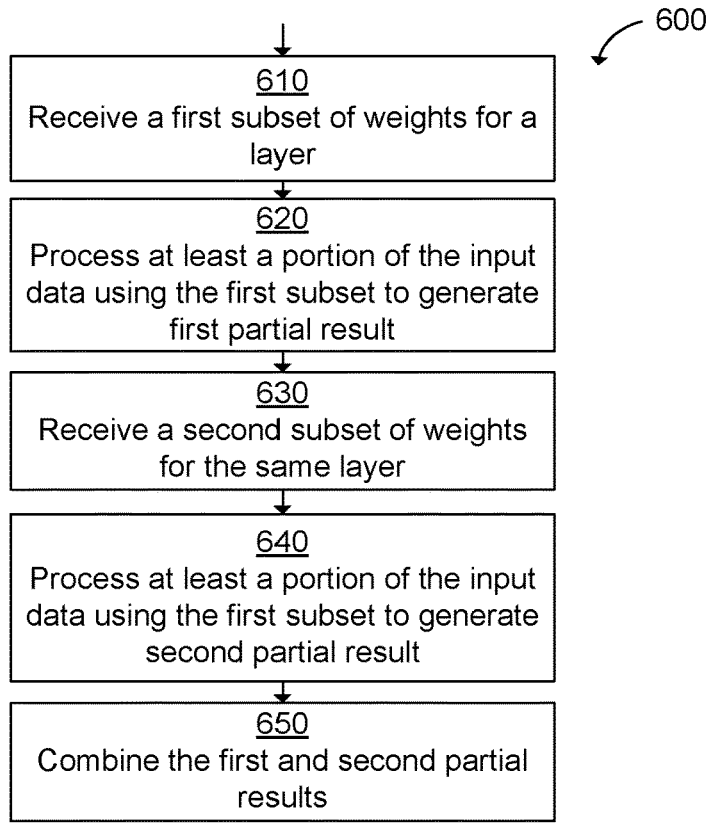
FIG. 6 shows an example method of processing data in the hardware implementation of a CNN of FIG. 2.

FIG. 6 illustrates an example method in accordance with the above processing of weights in two or more subsets. At step 610, the first subset of weights for a layer is received and processed at step 620 by convolving the first subset of weights in the convolution engines with at least a portion of the input data. The result of this convolution operation is a first partial result which is held in the accumulation buffer as mentioned previously. Then at step 630, a second subset of weights for the same layer is received and processed at step 640 using the same convolution engines, resulting in the generation of a second partial result which is stored in the accumulation buffer. The first and second partial results are combined to form at least a combined portion of the results for the CNN layer.

Accordingly, the processing of an entire layer is completed in two separate stages. This process can be considered to be two or more passes over the same set of input data, each pass using a different subset of weights that together form the set of weights for the layer. Whilst two separate reads of the input data for a particular layer may be required, this is a useful trade-off since a reduced silicon area is needed to implement the hardware implementation described herein.

It will be appreciated that the number of subsets of weights that are generated and separately processed in different passes will depend upon the size of the coefficient buffer and the number (and size) of the weights. It may be that two or more subsets of weights need to be defined and processed separately.

Size of Data

In another circumstance, it may be necessary to separate the input data into one or more subsets as a result of determining that the size of the input data is too large to be processed in a single pass. This circumstance may arise, for example, where the size of the input data to be processed in a particular layer is too large to be stored in the input buffers 245a-n. Accordingly, it is necessary to split the input data for a particular layer to process the data in two or more passes through the hardware implementation.

Figure 7A:
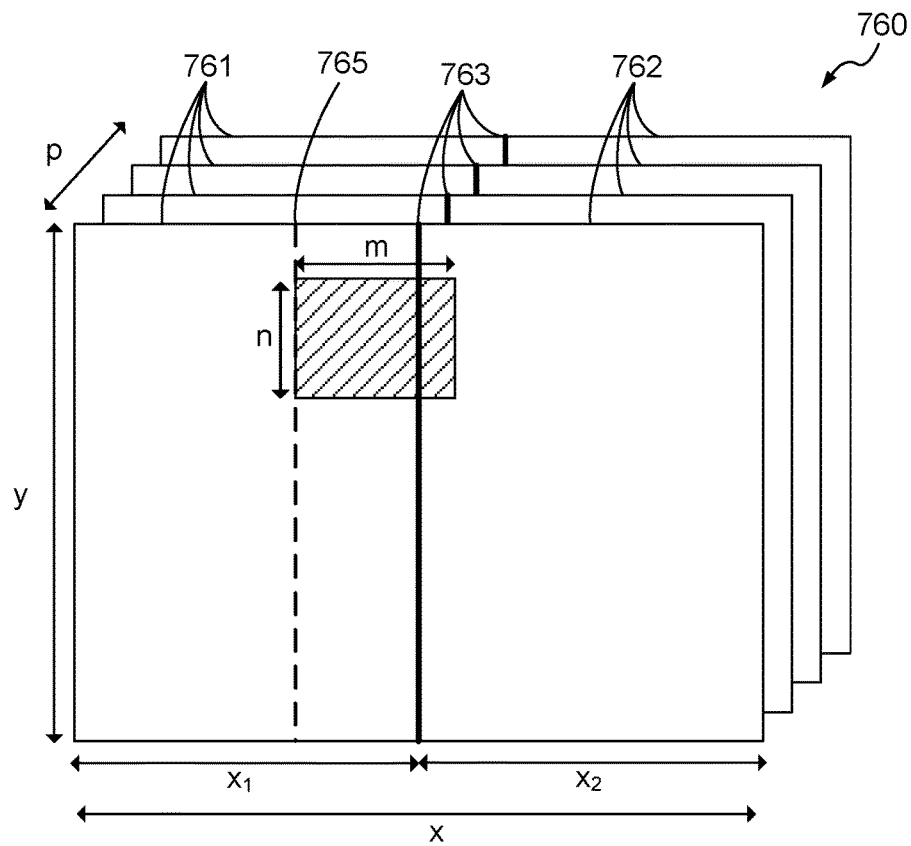
FIG. 7a shows an example division of input data for a layer into two or more subsets of input data for processing.

FIG. 7a illustrates an example structure of input data 760. The size of the input data is defined as a sequence of two-dimensional planes, with each plane defined by two dimensions x by y and with the input data for a layer having p planes. To form two subsets of data that are processed separately, the data area x by y by p can be split into two or more separate sub-areas, each defined as $x_1$ by y by p and $x_2$ by y by p, as illustrated in FIG. 7a where two defined sub-areas are separated by line 763. In this way, each of the subsets forms a portion of the input which may then be processed separately.

Specifically, a first data sub-area is defined and processed in a similar manner as previously described. This method is illustrated with reference to FIG. 7b. The first subset of input data (i.e. the first data sub-area) and the weight data is received at step 710 and passed to the convolution engines 240a to 240n. The first subset of input data is processed using the convolution engines at step 720 to generate a first partial result of the output values for a particular layer. Having processed the first subset of input data (i.e. the first data sub-area) and stored the resultant values back to external memory, the subset of input data (i.e. the second data sub-area) is received at step 730 and loaded into the input buffers for processing in a similar manner for processing at step 740. For the second and subsequent subsets of data (sub-areas), it is also necessary to re-load a portion of the first data sub-area to allow the convolution kernel to process areas of the data near the boundaries between the first and second sub-areas. An example of the re-loaded data is illustrated in FIG. 7a where the portion of the first sub-area defined between lines 713 and 715 is re-loaded, for example from external memory. The proportion of the first sub-area that is to be re-loaded will depend upon the size, m by n, of the convolution kernel and its relative position as it scans through the input data.

It will be appreciated that any number of sub-areas may be defined and the specific number of sub-areas will depend upon the size of the data and of the input buffers in the specific implementation.

Size of Filter Weights

Another circumstance in which the received inputs to the hardware implementation of the CNN are to be handled differently is an arrangement in which the size of a particular filter is too large to fit into the coefficient buffer. To separate a single filter into two portions (referred herein to sub-filters), it is necessary to store intermediately calculated values in the accumulator buffer and to restore the values into the accumulator buffer, as will be described in further detail below.

Figure 8A:
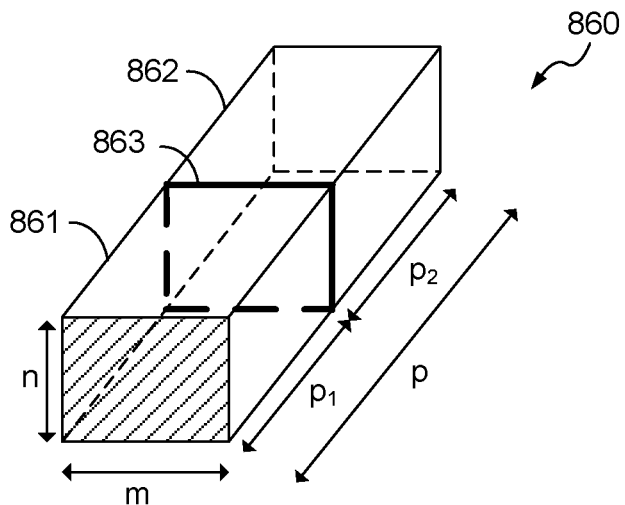
FIG. 8a shows an example division of weight data for a layer into two or more subsets of weight data for processing.

A filter weight to be separated into two sub-filters is illustrated in FIG. 8a. The filter weight 860 has dimensions m by n by p. As can be seen from FIG. 8a, the filter weight 800 is split by plane 863 into two separate sub-filters along dimension p to generate a first sub-filter 861 and a second sub-filter 862. The first sub-filter has dimension m by n by $p_1$ and the second sub-filter has dimension m by n by $p_2$.

Figure 8B:
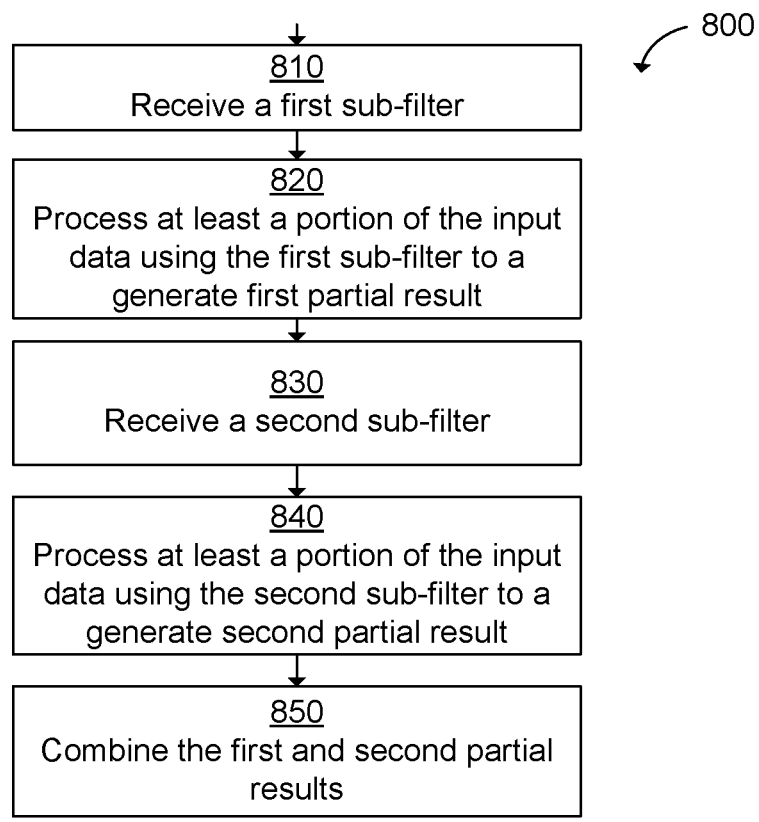

A method by which the first and second sub-filters are processed is illustrated in FIG. 8b. In order to process a particular layer for which filter 860 is to be used, the first sub-filter 861 is received at step 810 and the input data for the layer is retrieved, for example from external memory. At step 820, the first sub-filter is passed to the convolution engines 240a-n and convolution operations are performed in the convolution engines. The result of the convolution operations forms a first partial result which is then passed to the accumulation buffer 250.

In an example the first partial result that results from the convolution of the first sub-filter 861 with the input data for that layer is passed from the accumulation buffer 250 to external memory via the memory interface 210 to be stored.

Having stored the first partial result of the convolution of the first sub-filter 861 with the input data for that layer (for example in memory), the input data is provided to the convolution engines (for example again from memory) along with the second sub-filter 862 at step 830 of FIG. 8b. The second sub-filter is then used to process the input data at step 840 of FIG. 8b, in which a corresponding convolution calculation is performed based upon the same input data and the second sub-filter 862 and the result forms a second partial result which is passed to the accumulation buffer 250. The accumulation buffer then retrieves the intermediate result of the convolution of the first sub-filter 861 with the input data for that layer, for example from memory. The first partial result for the first sub-filter is then combined with the second partial result for the second sub-filter. The combined result is the result of applying the whole filter to the input data. In some arrangements, further sub-filters may be used, in which case the combination of the results of the first and second sub-filters would form a further partial result, which would need to be combined with other partial results. In order to combine the results of different sub-filters to form a resultant output for a particular layer, a result of the first sub-filter is loaded into the accumulator(s) as the starting value for the accumulators of the output of the result for the second sub-filter via the accumulator buffer 250.

It will be appreciated that the above-described approach may be expanded to each filter in a particular layer. Further, it will be appreciated that a particular weight may be split into any number of sub-filters depending upon the size of the filter weight and the size of the coefficient buffer.

Thus generally, the hardware implementation may be configured to separate or split at least one of the input data (for that layer) and the weight data (for that layer) into first and second (or more) portions and to process those portions separately to generate partial values. The hardware implementation may then be configured to combine the partial values together, either by storing the values together in the external memory, or by combining partial values together numerically in the accumulation buffer. It will be appreciated that other approaches for combining the partial values together can be achieved.

In some arrangements, a combination of one or more of the above-described approaches to splitting the received data into a number of smaller sets of data may be used, either for a single layer or across all of the layers. Some layers may not require any of the above splitting methods, where the size and number of the filter weights is small enough to fit in the coefficient buffer at the same time and where the input data is able to fit into the input buffers.

In some examples of the hardware implementation 200, the command decoder 220 is configured to provide control of the hardware 200 so as to implement the CNN. As part of that control, the command decoder 220 may receive a series of commands that define the operation of the CNN. In some arrangements, the commands that define the operation of the CNN may be retrieved from external memory via the memory interface 210 and may define precisely which layers of the CNN require the data for that layer to be split into separate portions for processing. The received commands may also define the manner in which they are split into the separate portions.

In addition, the format in which data is stored in the coefficient and input buffers may be defined in the received commands so that the hardware implementation 200 is able to read the data from the buffers. The performance of the hardware implementation in implementing the CNN will, at least partly, depend upon the number of elements of the weights and input data that can be stored in the buffers at a time since it is desirable to reduce the number of times that a memory read/write occurs. In another aspect of this application, there is described below a process of generating configuration data and reformatted input data for use in a hardware implementation of a CNN.

The above arrangements discuss a number of different ways in which the data to be processed in the convolution engines can be separated into smaller portions to be processed. For example, the input data can be split into sub-areas which are separately processed. Weight data can be split into separate weights which are processed separately or individual weights can be separated for processing. It will be appreciated that any combination of this portioning can be achieved in the hardware implementation of FIG. 2. For example, it is possible to provide only a sub-area of the input data and a subset of the weights to the convolution engines for processing during a single pass—which combines some of the features of the arrangement of FIGS. 6, 7a, and 7b. It will be appreciated that the processes described in FIGS. 6, 7a, 7b, 8a, and 8b can be combined in any combination. In addition, the processed described with reference to FIGS. 6, 7a, and 7b may need to be performed multiple times in order to complete the processing of a particular layer of the CNN using the hardware implementation 200. The multiple "passes" of the convolution engines is set out below with reference to FIGS. 9 to 12.

Figure 9:
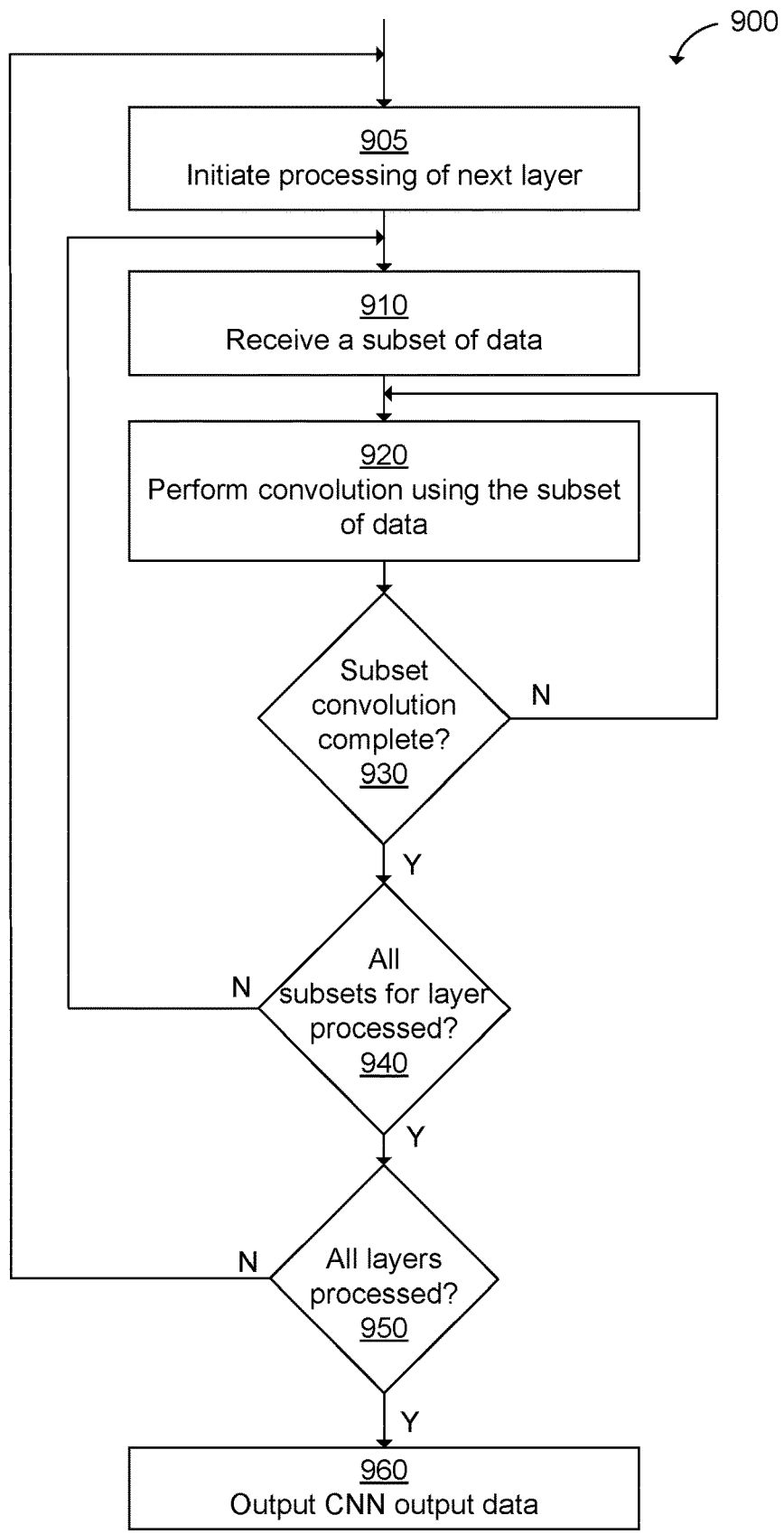
FIG. 9 shows an example method for processing data in the hardware implementation of FIG. 2.

FIG. 9 illustrates a method 900 of processing data in a hardware implementation of a CNN. In particular, the method of FIG. 9 illustrates a method of processing all of the layers of a CNN using, for example, the hardware implementation of FIG. 2. The method 900 of FIG. 9 relates to the arrangement of FIG. 5 in which data to be processed (either weight or input data or combination thereof) is separated into a plurality of subsets, which are each processed separately.

The method of FIG. 9 begins at step 905, at which the processing of the next layer is initiated. To begin with, the next layer is the first layer in the CNN. This may involve receiving any command data that is common to the layer, such as the format of data or weights to be used in processing the layer as well as control information that can be used to control the various hardware blocks of the hardware implementation and their interaction. For example, the command data may define whether or not the data in the accumulation buffer is to be passed to memory after each pass or whether it is to be re-loaded into the input buffer. Furthermore, the command data may also include data that defines the activation function that is to be implemented in the activation module. The command data also defines the manner in which the data is to be separated into multiple passes of the convolution engines of FIG. 2. For example, the command data may define the subsets of data for the particular layer and therefore the number of passes required to process a particular layer. For example, the command data may define the number of passes to complete processing of a particular subset. The command data may also define the number of subsets that collectively define the data for a layer.

At step 910, a first subset of data is received. As previously described, the first subset of data may be received via the memory interface and may be stored in the coefficient buffer or the input data buffer for processing. The subset of data for the layer may comprise at least a portion of the weight data and/or at least a portion of the input data such that more than one subset of data is required to process the data for a layer. At step 920, the first subset of data may be processed, for example in the convolution engines of FIG. 2. For example, where the subset comprises a subset of weights and a subset of input data, it may be that the subset is convolved against one another. It is then determined at step 930 whether or not further processing of the subset is complete. Where the subset comprises weight data, the weight data should be processed against all input data. This may involve multiple passes. Where the subset comprises input data, the subset should be processed against all of the input data before a further subset is received. In summary, the subset should be entirely processed for that layer, whether against input or weight data, so that it is not necessary to re-load the subset of data.

If the subset convolution is not complete, the method returns to step 920 and the first subset of data is processed against further data. This process is repeated, for example each pass using the convolution engines of FIG. 2, until the first subset of data has been processed against all required data (whether input data, weight data or combination thereof).

Once complete, the method proceeds to step 940 at which it is determined if all of the subsets for the layer have been processed. In the first pass, where only the first subset of data has been processed, not all of the subsets will have been processed. In subsequent passes, it is determined whether or not all of the subsets for the layer have been processed. If not all of the subsets for the layer have been processed, the method returns to step 910 at which a subsequent (e.g. a second) subset is processed at steps 920 against data for the layer, for example using the convolution engines of FIG. 2.

Once it has been determined that all of the subsets for a layer are processed at step 940, it can be concluded that the processing of that layer has been completed. At step 950, it is determined whether or not the all of the layers of the CNN have been processed. If not all of the layers have been processed, the process returns to step 905 at which the processing of the next layer is initiated by loading command or control data for that layer. The process described above is then repeated for each layer and, once complete, the CNN output data 960 is output.

Figure 10:
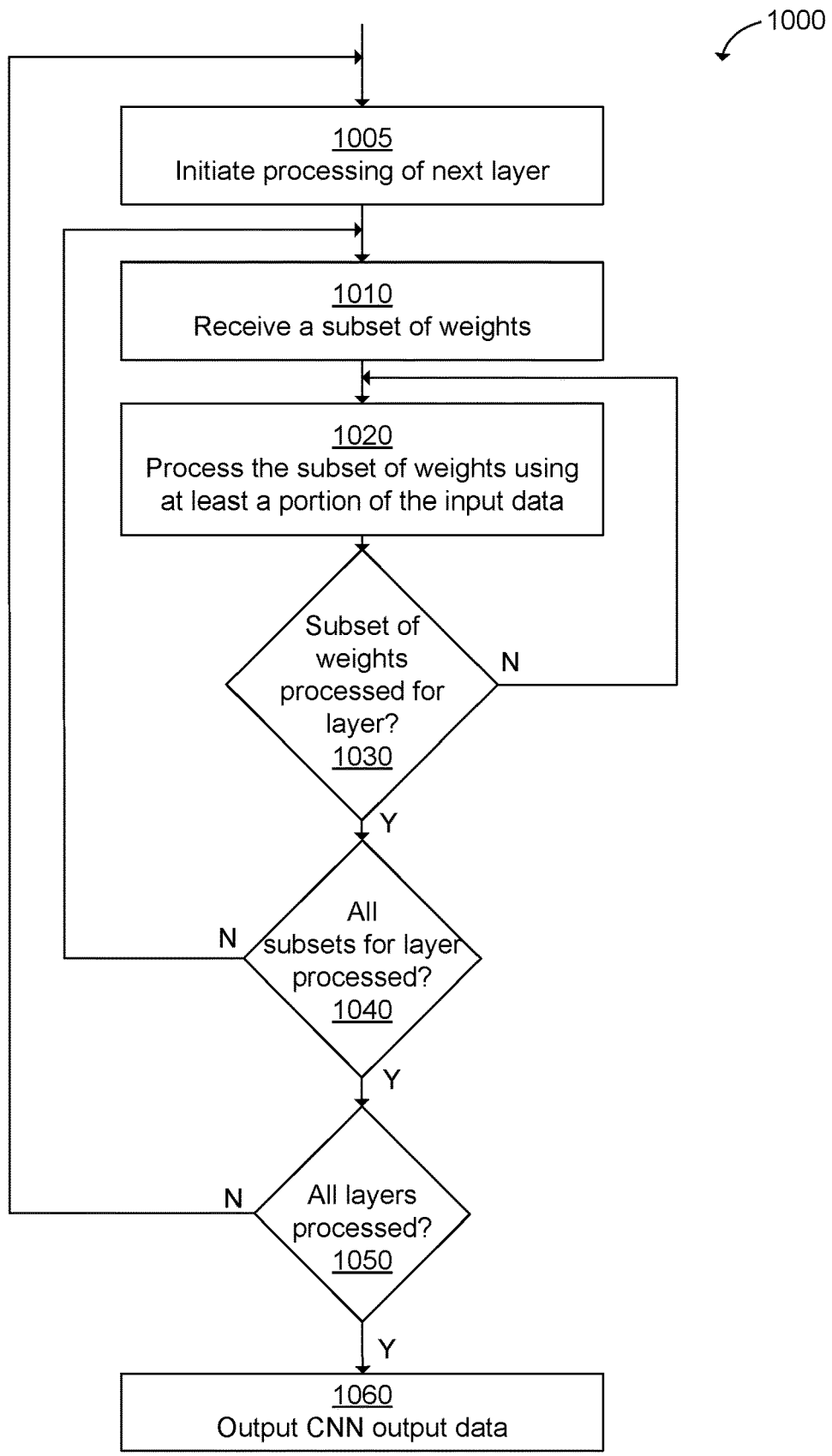
FIG. 10 shows an example method for processing data in the hardware implementation of FIG. 2.

FIG. 10 relates to the arrangement of FIG. 6 and describes the processing of various layers of a CNN using a hardware implementation.

The method of FIG. 10 illustrates an example where the subset comprises a subset of weights for the layer. Method 1000 begins at step 1005, at which the processing of the next layer is initiated. To begin with, the next layer is the first layer in the CNN. This may involve receiving any command data that is common to the layer, such as the format of data or weights to be used in processing the layer as well as control information that can be used to control the various hardware blocks of the hardware implementation and their interaction. For example, the command data may define whether or not the data in the accumulation buffer is to be passed to memory after each pass or whether it is to be re-loaded into the input buffer. Furthermore, the command data may also include data that defines the activation function that is to be implemented in the activation module.

At step 1010, a first subset of weights is received. As previously described, the first subset of weights may be received via the memory interface and may be stored in the coefficient buffer for processing. At step 1020, the first subset of weights may be processed, for example in the convolution engines of FIG. 2, against at least a portion of the input data. It is then determined at step 1030 whether or not all of the input data for that layer has been convolved with the first subset of weights. If not, the method returns to step 1020 and the first subset of weights is processed against further input data. This process is repeated, for example each pass using the convolution engines of FIG. 2, until the first portion of weights has been processed against all of the input data.

Once complete, the method proceeds to step 1040 at which it is determined if all of the weights for the layer have been processed. In the first pass, where only the first subset of weights have been processed, not all of the weights for the layer will have been processed since the first subset of weights is a subset of all of the weights for a layer. If not all of the weight subsets for the layer have been processed, the method returns to step 1010 at which a subsequent (e.g. a second) subset of weights are processed at steps 1020 against all input data for the layer, for example using the convolution engines of FIG. 2.

Once it has been determined that all of the weight subsets for a layer are processed at step 1040, it can be concluded that the processing of that layer has been completed. At step 1050, it is determined whether or not the all of the layers of the CNN have been processed. If not all of the layers have been processed, the process returns to step 1005 at which the processing of the next layer is initiated by loading command or control data for that layer. The process described above is then repeated for each layer and the CNN output data 1060 is output.

Figure 7B:
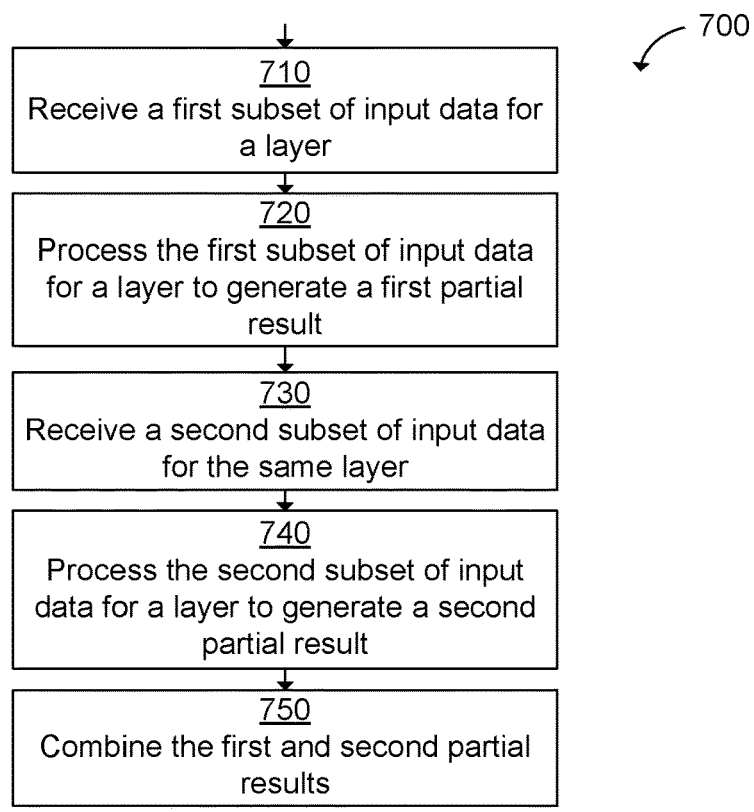
Figure 11:
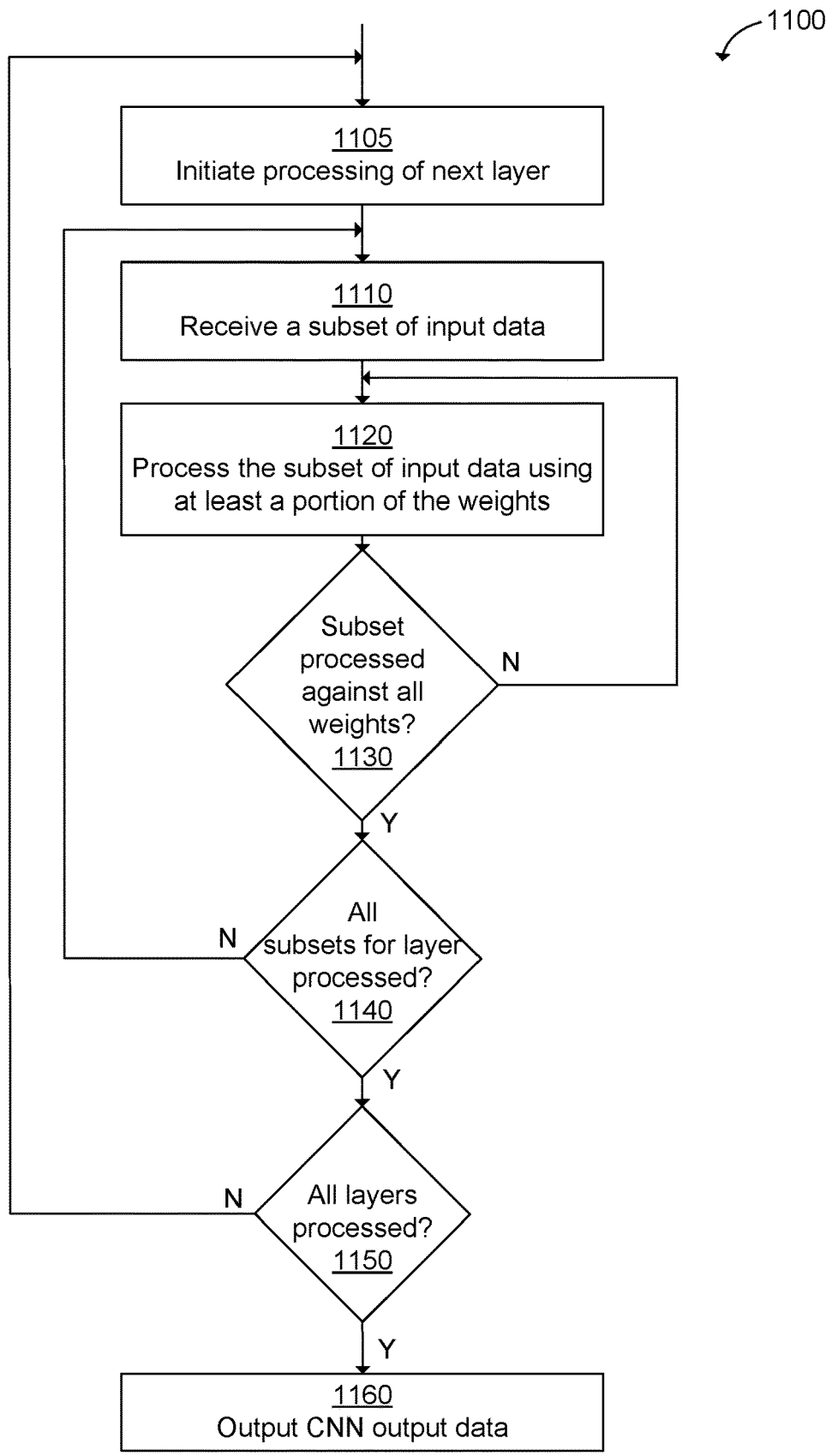
FIG. 11 shows an example method for processing data in the hardware implementation of FIG. 2.

FIG. 11 relates to the arrangement of FIG. 7*b* and describes the processing of various layers of a CNN using a hardware implementation. The method is similar to the methods of FIGS. 9 and 10. In this arrangement, the subset of data comprises a subset of the input data. The arrangement of FIG. 11 operates in a similar manner to the arrangement of FIGS. 9 and 10. In the arrangement of FIG. 11, the subset comprises a subset of input data. The subset of input data is processed using at least a portion of the weights, for example using the convolution engines of FIG. 2, at step 1120. This process is repeated in a similar manner to FIGS. 9 and 10, with each pass of step 1120 processing the subset with at least some of the weights until all of the weights have been processed using the subset of input data for a layer. This process is repeated for all subsets of a layer, and then again for each layer of the CNN. As mentioned previously, it may be necessary to re-load a portion of a previously processed subset of input data due to the overlap required when using a filter of a particular size, as illustrated in FIG. 7*a*.

Figure 12:
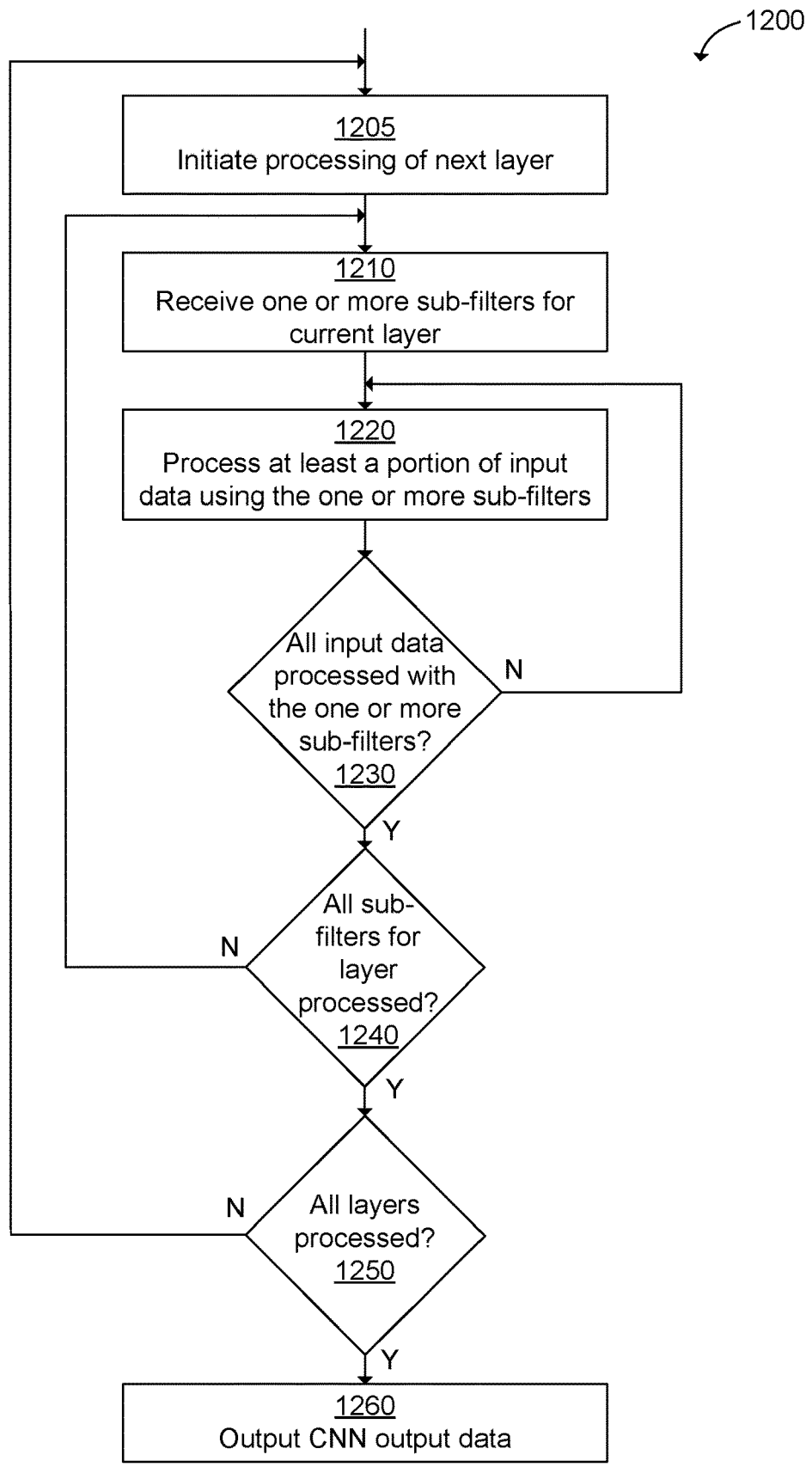
FIG. 12 shows an example method for processing data in the hardware implementation of FIG. 2.

FIG. 12 illustrates a method in accordance with FIGS. 9 to 11, where a first subset comprises a first sub-filter and subsequent subsets comprise a subsequent sub-filter for the layer. The method therefore comprises received one or more sub-filters for a current layer at step 1210 and then processing at least a portion of the input data for the layer using the one or more sub-filters at step 1220. At step 1230 at it is determined whether or not all of the input data for the layer has been processed using the one or more sub-filters, if not the method returns to step 1220 to process at least another portion of the input data using the one or more sub-filters. The process is repeated for each of the sub-filters and the results are combined, for example in the accumulation buffer or in the accumulators of the hardware arrangement of FIG. 2.

Figure 13:
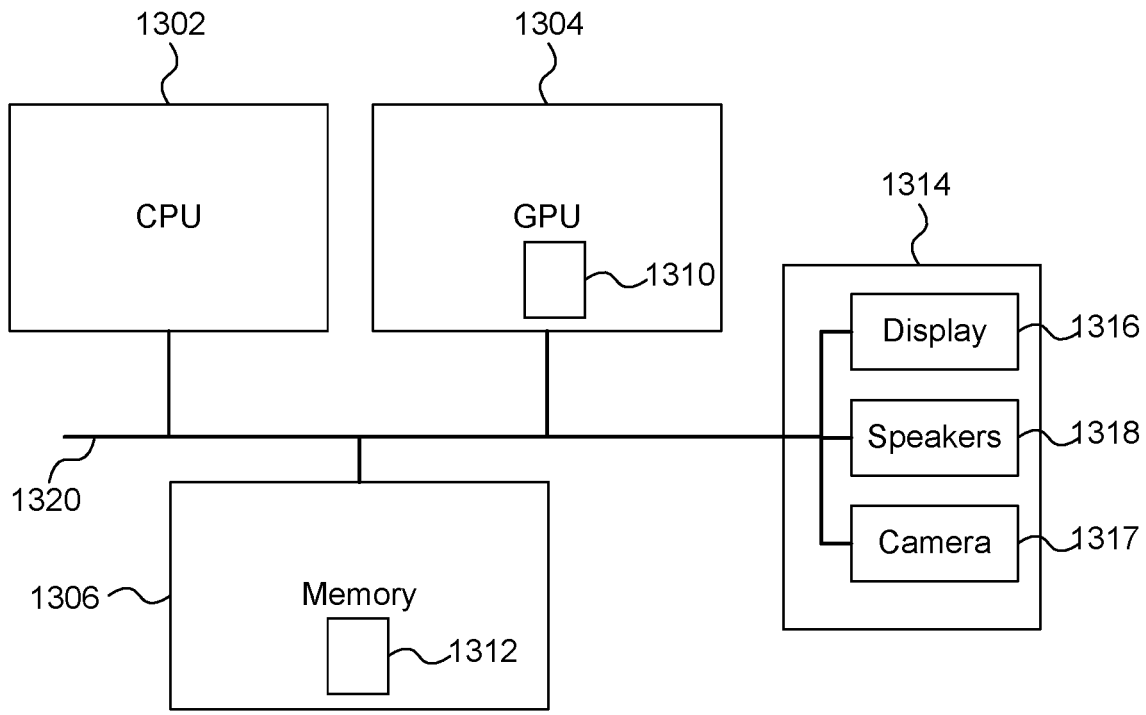
FIG. 13 shows a computer system in which a hardware implementation of a CNN or an activation module for a CNN is implemented.

FIG. 13 shows a computer system in which the hardware implementation of a CNN or an activation module for a CNN described herein may be implemented. The computer system comprises a CPU 1302, a GPU 1304, a memory 1306 and other devices 1314, such as a display 1316, speakers 1318 and a camera 1317. A processing block 1310 is implemented on the GPU 1304. In other examples, the processing block 1310 may be implemented on the CPU 1302. The processing block 1310 may also be implemented in a separate unit (not shown). The processing block 1310 may comprise digital logic configured to implement the hardware implementation 200. The hardware implementation 200 may be controlled by an external processor, such as the GPU 1304 or the CPU 1302, or another processor not shown. The components of the computer system can communicate with each other via a communications bus 1320. A store 1312 is implemented as part of the memory 1306.

The hardware implementations 200 of the CNN or the activation module for a CNN illustrated in FIGS. 1 to 12 are shown as comprising a number of functional blocks. This is schematic only and is not intended to define a strict division between different logic elements of such entities. Each functional block may be provided in any suitable manner. It is to be understood that intermediate values described herein as being formed by a hardware implementation of a CNN or an activation module for a CNN need not be physically generated by the hardware implementation of a CNN or the activation module for a CNN at any point and may merely represent logical values which conveniently describe the processing performed by the hardware implementation of a CNN or the activation module for a CNN between its input and output.

The hardware implementations of a CNN or the activation modules for a CNN described herein may be embodied in hardware on an integrated circuit. The hardware implementations of a CNN or the activation modules for a CNN described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a hardware implementation of a CNN or an activation module for a CNN configured to perform any of the methods described herein, or to manufacture a hardware implementation of a CNN or an activation module for a CNN comprising any apparatus described herein. An integrated circuit definition dataset may be, for example, an integrated circuit description.

Therefore, there may be provided a method of manufacturing, at an integrated circuit manufacturing system, a hardware implementation of a CNN or an activation module for a CNN as described herein. Furthermore, there may be provided an integrated circuit definition dataset that, when processed in an integrated circuit manufacturing system, causes the method of manufacturing a hardware implementation of a CNN or an activation module for a CNN to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation of a CNN or an activation module for a CNN will now be described with respect to FIG. 14.

Figure 14:
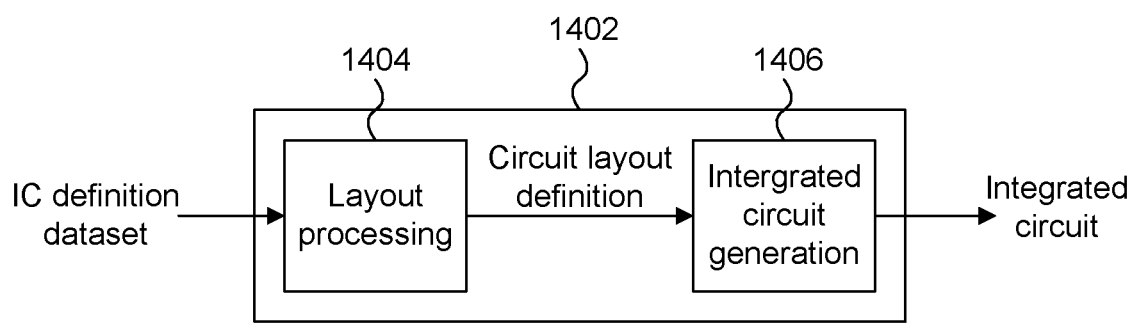
FIG. 14 shows an integrated circuit manufacturing system for generating an integrated circuit embodying a hardware implementation of a CNN or an activation module for a CNN.

FIG. 14 shows an example of an integrated circuit (IC) manufacturing system 1402 which comprises a layout processing system 1404 and an integrated circuit generation system 1406. The IC manufacturing system 1402 is configured to receive an IC definition dataset (e.g. defining a hardware implementation of a CNN or an activation module for a CNN as described in any of the examples herein), process the IC definition dataset, and generate an IC according to the IC definition dataset (e.g. which embodies a hardware implementation of a CNN or an activation module for a CNN as described in any of the examples herein). The processing of the IC definition dataset configures the IC manufacturing system 1402 to manufacture an integrated circuit embodying a hardware implementation of a CNN or an activation module for a CNN as described in any of the examples herein.

The layout processing system 1404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1404 has determined the circuit layout it may output a circuit layout definition to the IC generation system 1406. A circuit layout definition may be, for example, a circuit layout description.

The IC generation system 1406 generates an IC according to the circuit layout definition, as is known in the art. For example, the IC generation system 1406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1406 may be in the form of computer-readable code which the IC generation system 1406 can use to form a suitable mask for use in generating an IC.

The different processes performed by the IC manufacturing system 1402 may be implemented all in one location, e.g. by one party. Alternatively, the IC manufacturing system 1402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation of a CNN or an activation module for a CNN without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 14 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 14, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method in a hardware implementation of a Convolutional Neural Network (CNN), the method comprising:
receiving a first subset of data comprising at least a portion of weight data and at least a portion of input data for a CNN layer, storing the weight data of the first subset of data in a coefficient buffer of the hardware implementation and storing the input data of the first subset of data in a plurality of input buffers of the hardware implementation;
passing the first subset of data from the coefficient buffer and the plurality of input buffers to a plurality of convolution engines of the hardware implementation and performing, in one or more passes of the plurality of convolution engines, a convolution of the first subset of data to generate a first partial result;
receiving a second subset of data comprising at least a portion of weight data and at least a portion of input data for the CNN layer, storing the weight data of the second subset of data in the coefficient buffer and storing the input data of the second subset of data in the plurality of input buffers such that the second subset of data replaces at least a portion of the first subset of data in the coefficient buffer and/or the plurality of input buffers;
passing the second subset of data from the coefficient buffer and the plurality of input buffers to the plurality of convolution engines and performing, in one or more subsequent passes of the plurality of convolution engines, a convolution of the second subset of data to generate a second partial result; and
combining the first partial result and the second partial result to generate at least a portion of convolved data for the CNN layer;
wherein the plurality of input buffers are connected to each of a plurality of multiplexers of the hardware implementation, each multiplexer configured to select an output from one of the plurality of input buffers and to pass values output from the selected input buffer to a respective convolution engine of the plurality of convolution engines;
wherein each convolution engine of the plurality of convolution engines comprises a plurality of elements of multiply logic and a plurality of elements of addition logic, the plurality of elements of addition logic forming an adder tree configured to generate a sum of the outputs of the plurality of elements of multiply logic.

2. A method according to claim 1, wherein:
the first subset of data comprises a first portion of the input data for the CNN layer and all or a portion of the weight data for the CNN layer; and
the second subset of data comprises a second portion of the input data for the CNN layer and all or a portion of the weight data for the CNN layer.

3. A method according to claim 2, wherein the second portion of the input data comprises a subset of the first portion of the input data and wherein the size of the subset of the first portion of the input data is based upon a size of a convolution kernel.

4. A method according to claim 2, wherein the first subset of data and the second subset of data each comprise all of the weight data for the CNN layer.

5. A method according to claim 1, wherein:
the first subset of data comprises a first portion of the weight data for the CNN layer and all or a portion of the input data for the CNN layer; and
the second subset of data comprises a second portion of the weight data for the CNN layer and all or a portion of the input data for the CNN layer.

6. A method according to claim 5, wherein the first subset of data and the second subset of data each comprise all of the input data for the CNN layer.

7. A method according to claim 5, wherein the first portion of the weight data comprises a different portion of the weight data for the CNN layer to the second portion of the weight data.

8. A method according to claim 1, wherein the combining of the first partial result and the second partial result comprises writing the first partial result and the second partial result to a memory.

9. A method according to claim 1, wherein:
the weight data for the CNN layer comprises a plurality of weights and the plurality of weights form one or more filters;
the first subset of data comprises a first portion of a filter of the one or more filters and all or a portion of the input data for the CNN layer; and
the second subset of data comprises a second portion of the filter and all or a portion of the input data for the CNN layer.

10. A method according to claim 9, wherein combining the first partial result and the second partial result to generate at least a portion of convolved data for the CNN layer comprises:
performing, in the one or more passes of the plurality of convolution engines, a convolution of the first portion of the filter with the input data to generate the first partial result;
performing, in the one or more subsequent passes of the plurality of convolution engines, a convolution of the second portion of the filter with the input data to generate the second partial result;
placing the first partial result in an accumulator buffer; and
combining the first partial result with the second partial result in an accumulator.

11. A method according to claim 9, wherein the first portion of the filter and the second portion of the filter are non-overlapping portions of the filter.

12. A method according to claim 9, wherein the input data of the first subset of data and the input data of the second subset of data comprises all of the input data for the CNN layer.

13. A method according to claim 1, further comprising receiving command data that defines the first subset of data and the second subset of data for processing in the CNN layer.

14. A hardware implementation of a Convolutional Neural Network (CNN), the hardware implementation comprising:
a coefficient buffer;
a plurality of input buffers;
an interface configured to:
receive a first subset of data comprising at least a portion of weight data and at least a portion of input data for a CNN layer, store the weight data of the first subset of data in the coefficient buffer and store the input data of the first subset of data in the plurality of input buffers, and
subsequently receive a second subset of data comprising at least a portion of weight data and at least a portion of input data for the CNN layer, store the weight data of the second subset of data in the coefficient buffer and store the input data of the second subset of data in the plurality of input buffers such that the second subset of data replaces at least a portion of the first subset of data in the coefficient buffer and/or the plurality of input buffers;
a plurality of convolution engines comprising a plurality of elements of multiply logic and a plurality of elements of addition logic, the plurality of elements of addition logic forming an adder tree configured to generate a sum of the outputs of the plurality of elements of multiply logic, the plurality of convolution engines configured to:
receive the first subset of data from the coefficient buffer and the plurality of input buffers and perform in one or more passes of the plurality of convolution engines a convolution of the first subset of data to generate a first partial result, and
subsequently receive the second subset of data from the coefficient buffer and the plurality of input buffers and perform in one or more subsequent passes of the plurality of convolution engines a convolution of the second subset of data to generate a second partial result; and
a plurality of multiplexers, each multiplexer connected to each of the plurality of input buffers and configured to select an output from one of the plurality of input buffers and to pass values output from the selected input buffer to a respective convolution engine of the plurality of convolution engines;
wherein the hardware implementation is configured to combine the first partial result and the second partial result to generate at least a portion of convolved data for the CNN layer.

15. A hardware implementation according to claim 14, wherein:
the first subset of data comprises a first portion of the input data for the CNN layer and all or a portion of the weight data for the CNN layer; and
the second subset of data comprises a second portion of the input data for the CNN layer and all or a portion of the weight data for the CNN layer.

16. A hardware implementation according to claim 14, wherein:
the first subset of data comprises a first portion of the weight data for the CNN layer and all or a portion of the input data for the CNN layer; and
the second subset of data comprises a second portion of the weight data for the CNN layer and all or a portion of the input data for the CNN layer.

17. A hardware implementation according to claim 14, wherein the hardware implementation is configured to combine the first partial result and the second partial result by writing the first partial result and the second partial result to a memory.

18. A hardware implementation according to claim 14, wherein:
the weight data for the CNN layer comprises a plurality of weights and the plurality of weights form one or more filters;
the first subset of data comprises a first portion of a filter of the one or more filters and all or a portion of the input data for the CNN layer; and
the second subset of data comprises a second portion of the filter and all or a portion of the input data for the layer.

19. A hardware implementation according to claim 14, wherein the hardware implementation is configured to receive command data that defines the first subset of data and the second subset of data for processing in the CNN layer.

20. A non-transitory computer readable storage medium having stored thereon a computer readable dataset description of an integrated circuit that, when processed in an integrated circuit manufacturing system, causes the integrated circuit manufacturing system to manufacture a hardware implementation of a Convolutional Neural Network (CNN), the hardware implementation comprising:
a coefficient buffer;
a plurality of input buffers;
an interface configured to:
receive a first subset of data comprising at least a portion of weight data and at least a portion of input data for a CNN layer, store the weight data of the first subset of data in the coefficient buffer and store the input data of the first subset of data in the plurality of input buffers, and
subsequently receive a second subset of data, the second subset of data comprising at least a portion of weight data and at least a portion of input data for the CNN layer, store the weight data of the second subset of data in the coefficient buffer and store the input data of the second subset of data in the plurality of input buffers such that the second subset of data replaces at least a portion of the first subset of data in the coefficient buffer and/or the plurality of input buffers;
a plurality of convolution engines comprising a plurality of elements of multiply logic and a plurality of elements of addition logic, the plurality of element of addition logic forming an adder tree configured to generate a sum of the outputs of the plurality of elements of multiply logic, the plurality of convolution engines configured to:
receive the first subset of data from the coefficient buffer and the plurality of input buffers and perform in one or more passes of the plurality of convolution engines a convolution of the first subset of data to generate a first partial result, and
subsequently receive the second subset of data from the coefficient buffer and the plurality of input buffers and perform in one or more subsequent passes of the plurality of convolution engines a convolution of the second subset of data to generate a second partial result; and
a plurality of multiplexers, each multiplexer connected to each of the plurality of input buffers and configured to select an output from one of the plurality of input buffers and to pass values output from the selected input buffer to a respective convolution engine of the plurality of convolution engines;
wherein the hardware implementation is configured to combine the first partial result and the second partial result to generate at least a portion of convolved data for the CNN layer.

* * * * *